United States Patent
Ploegert et al.

(10) Patent No.: US 10,921,833 B2
(45) Date of Patent: Feb. 16, 2021

(54) THERMOSTAT WITH PREDICTIVE VARIABLE AIR VOLUME (VAV) PERFORMANCE FEATURES

(71) Applicant: Johnson Controls Technology Company, Auburn Hills, MI (US)

(72) Inventors: Justin J. Ploegert, Cudahy, WI (US); Joseph R. Ribbich, Waukesha, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 151 days.

(21) Appl. No.: 15/926,314

(22) Filed: Mar. 20, 2018

(65) Prior Publication Data

US 2019/0294186 A1    Sep. 26, 2019

(51) Int. Cl.
| | |
|---|---|
| *F24F 11/52* | (2018.01) |
| *G05D 23/19* | (2006.01) |
| *F24F 11/88* | (2018.01) |
| *F24F 11/63* | (2018.01) |
| *F24F 110/10* | (2018.01) |

(52) U.S. Cl.
CPC .......... *G05D 23/1904* (2013.01); *F24F 11/52* (2018.01); *F24F 11/63* (2018.01); *F24F 11/88* (2018.01); *G05D 23/1906* (2013.01); *F24F 2110/10* (2018.01)

(58) Field of Classification Search
CPC . G05D 23/1904; G05D 23/1906; F24F 11/88; F24F 11/52; F24F 11/63
See application file for complete search history.

(56) References Cited

U.S. PATENT DOCUMENTS

| | | | | | |
|---|---|---|---|---|---|
| 4,711,394 | A | * | 12/1987 | Samuel | F24F 3/0442 165/209 |
| 2008/0183424 | A1 | * | 7/2008 | Seem | G05B 23/0216 702/181 |

(Continued)

FOREIGN PATENT DOCUMENTS

JP    2596603 B2  *  4/1997

OTHER PUBLICATIONS

Advanced Variable Air Volume System Design Guide, California Energy Commission, Oct. 2003, https://newbuildings.org/sites/default/files/A-11_LG_VAV_Guide_3.6.2.pdf, 228 pages.

*Primary Examiner* — Elizabeth J Martin
*Assistant Examiner* — Nael N Babaa
(74) *Attorney, Agent, or Firm* — Foley & Lardner LLP

(57) ABSTRACT

A thermostat for includes a processing circuit configured to operate the building equipment to control an environmental condition within a building including a first zone and second zones and receive a first time-series data set for a parameter of a first piece of the building equipment associated with the first zone. The processing circuit is configured to receive second time-series data sets for the parameter of second pieces of building equipment associated with the second zones. The processing circuit is configured to perform a comparison including comparing the first time-series data set with the second time-series data sets and generate recommendations for improving the performance of the first piece of building equipment based on the comparison of the first time-series data set with the second time-series data sets.

20 Claims, 13 Drawing Sheets

(56) References Cited

U.S. PATENT DOCUMENTS

| | | | |
|---|---|---|---|
| 2008/0284449 A1* | 11/2008 | Phadke | H02M 1/32 |
| | | | 324/548 |
| 2009/0140060 A1* | 6/2009 | Stoner | G05D 23/1934 |
| | | | 236/51 |
| 2009/0302994 A1 | 12/2009 | Rhee et al. | |
| 2013/0151179 A1 | 6/2013 | Gray | |
| 2015/0168001 A1 | 6/2015 | Steinberg | |
| 2017/0058567 A1* | 3/2017 | Ivanovic | A47L 15/4259 |
| 2017/0105095 A1* | 4/2017 | Um | H04W 4/80 |
| 2018/0253114 A1* | 9/2018 | Wells | G05D 23/1902 |
| 2019/0041883 A1* | 2/2019 | Clark | F24F 11/30 |

* cited by examiner

THERMOSTAT WITH PREDICTIVE VARIABLE AIR VOLUME (VAV) PERFORMANCE FEATURES

BACKGROUND

The present disclosure relates generally to heating, ventilation, and air conditioning (HVAC) systems. The present disclosure relates more particularly to improving the performance of HVAC systems via data analysis.

A building can include an HVAC system airside system including an air handler unit (AHU), multiple variable air volume units (VAVs) associated with various zones, and a thermostat configured to control the AHU and/or the VAVs. The AHU can be configured to heat or cool air, provide the heated or cooled air to the VAV units, and heat or cool the air of the zones by the VAV units. In some circumstances, the VAV units and the zones which each VAV unit is associated with are all similar and therefore the VAV units are expected to perform in a similar manner. However, this may not always be the case since various failures can occur for the VAV units and/or the AHU unit or physical changes (e.g., a window being opened) can occur within a zone. A system and method for performing analysis on the performance of the VAV units and the AHU based on the performance similarities between the VAV units and the zones may be desirable to identify improvements to the performance of the VAV units and/or the AHU unit.

SUMMARY

One implementation of the present disclosure is a thermostat for predicting a performance of building equipment and controlling the building equipment. The thermostat includes a processing circuit configured to operate the building equipment to control an environmental condition within a building including a first zone and second zones, receive a first time-series data set for a parameter of a first piece of the building equipment associated with the first zone, and receive second time-series data sets for the parameter of second pieces of building equipment associated with the second zones. The first piece of building equipment and second pieces of building equipment are a same type of building equipment. The processing circuit is configured to perform a comparison including comparing the first time-series data set with the second time-series data sets and generate recommendations for improving the performance of the first piece of building equipment based on the comparison of the first time-series data set with the second time-series data sets.

In some embodiments, the processing circuit is configured to generate a parameter update for the first piece of building equipment in response to determining that the first piece of building equipment is not operating properly based on the comparison of the first time-series data set with the second time-series data sets and control the first piece of building equipment to control an environmental condition of the first zone based on the generated parameter update.

In some embodiments, the processing circuit is configured to transmit the first time series data set and the second time series data sets to a cloud server system. The cloud server system can be configured to generate analysis updates. In some embodiments, the processing circuit is configured to receive, from the cloud server system, the analysis updates and compare the first time-series data set with the second time-series data sets based on the received analysis updates.

In some embodiments, the parameter is a zone temperature (ZNT). In some embodiments, the first time-series data set includes a first values for the ZNT and each of the second time-series data sets include a second values for the ZNT. In some embodiments, the processing circuit is configured to compare the first time-series data set with the second-time series data sets by determining a time-to-setpoint threshold based on the second ZNT values for each of the second time-series data sets, determining whether the ZNT of the first zone has reached a temperature setpoint within the time-to-setpoint threshold based on the first ZNT values for the first time-series data set, and determining that the first piece of building equipment is not operating properly in response to determining that the ZNT of the first zone has not reached the temperature setpoint within the time-to-setpoint threshold.

In some embodiments, the processing circuit is configured to generate a first EWMA based on the first time-series data set, generate second EWMAs based on the second time-series data sets, and compare the first time-series data set with the second time-series data sets by comparing the first EWMA with the second EWMAs.

In some embodiments, comparing the first EWMA with the second EWMAs includes determining whether the first EWMA is a predefined amount less than or greater than the second EWMAs, determining that the first piece of building equipment is not operating properly in response to determining that the first EWMA is the predefined amount less than or greater than the second EWMAs, and determining that the first piece of building equipment is operating properly in response to determining that the first EWMA is not the predefined amount less than or greater than the second EWMAs.

In some embodiments, the processing circuit is configured to generate a recommendation interface based on the recommendations, wherein the recommendation interface includes an indication of each of the recommendations and a feedback element, cause a user device to display the recommendation interface on a user interface of the user device, receive feedback from the user device, wherein the feedback is based on a user interaction with the feedback element via the user interface of the user device, and generate new recommendations for improving the performance of the first piece of building equipment in response to determining that the first piece of building equipment is not operating properly and based on the received feedback.

In some embodiments, the feedback element includes a first element indicating that a particular recommendation of the recommendations improved the performance of the first piece of building equipment and a second element indicating that the particular recommendation did not improve the performance of the first piece of building equipment. In some embodiments, the feedback element includes a custom recommendation element for inputting a user defined custom recommendation. In some embodiments, the processing circuit is configured to receive the user defined custom recommendation from the user device, wherein the user defined custom recommendation is entered by a user of the user device via the custom recommendation element and generate the new recommendations for improving the performance of the first piece of building equipment in response to determining that the first piece of building equipment is not operating properly based on the received feedback and the user defined custom recommendation.

In some embodiments, the first piece of building equipment associated with the first zone is a first variable air volume (VAV) box configured to receive air from an air handler unit (AHU), where the second pieces of building equipment associated with the second zones are second VAV boxes configured to receive air from the AHU.

In some embodiments, the parameter is a zone temperature (ZNT) and the first time-series data set includes a first values for the ZNT and the second time-series data sets each include a second values for the ZNT. In some embodiments, the processing circuit is configured to determine a first time-to-setpoint value for the first VAV box and second time-to-setpoint values for the second VAV boxes based on the first ZNT values of the first time-series data set and second ZNT values of the second time-series data sets, determine whether the first time-to-setpoint value and the second time-to-setpoint values are greater than a predefined amount, and generate an AHU recommendation in response to determining that the first time-to-setpoint value and the second time-to-setpoint values are greater than the predefined amount, where the AHU recommendation includes an indication to perform maintenance on the AHU.

In some embodiments, the parameter of the first VAV box is an airflow parameter, where the first time-series data set includes a value for the airflow parameter and each of the second time-series data sets includes a values for the airflow parameter, where the airflow parameter includes at least one of a differential pressure parameter and an airflow rate parameter. In some embodiments, the processing circuit is configured to compare the first time-series data set with the second time-series data sets by determining an airflow threshold based on the values for the airflow parameter of each of the second time-series data sets and determining that the first VAV box is not operating properly in response to determining that value of the airflow parameter for the first time-series data set is greater than the airflow threshold. In some embodiments, the recommendation includes a recommendation to close a door or window within the first zone.

Another implementation of the present disclosure is a method for predicting a performance of building equipment and controlling the building equipment via a thermostat. The method includes operating the building equipment to control an environmental condition within a building including a first zone and second zones and receiving a first time-series data set for a parameter of a first piece of the building equipment associated with the first zone. The method includes receiving second time-series data sets for the parameter of second pieces of building equipment associated with the second zones. The first piece of building equipment and the second pieces of building equipment are a same type of building equipment. The method includes performing a comparison including comparing the first time-series data set with the second time-series data sets and generating recommendations for improving the performance of the first piece of building equipment based on the comparison of the first time-series data set with the second time-series data sets.

In some embodiments, the method includes generating a parameter update for the first piece of building equipment in response to determining that the first piece of building equipment is not operating properly based on the comparison of the first time-series data set with the second time-series data sets and controlling the first piece of building equipment to control an environmental condition of the first zone based on the generated parameter update.

In some embodiments, the method includes transmitting the first time series data set and the second time series data sets to a cloud server system. In some embodiments, the cloud server system is configured to generate analysis updates. In some embodiments, the method includes receiving, from the cloud server system, the analysis updates and comparing the first time-series data set with the second time-series data sets is based on the received analysis updates.

In some embodiments, the parameter is a zone temperature (ZNT), wherein the first time-series data set includes a first values for the ZNT and each of the second time-series data sets include a second values for the ZNT. In some embodiments, comparing the first time-series data set with the second-time series data sets includes determining a time-to-setpoint threshold based on the second ZNT values for each of the second time-series data sets, determining whether the ZNT of the first zone has reached a temperature setpoint within the time-to-setpoint threshold based on the first ZNT values for the first time-series data set, and determining that the first piece of building equipment is not operating properly in response to determining that the ZNT of the first zone has not reached the temperature setpoint within the time-to-setpoint threshold.

In some embodiments, the first piece of building equipment associated with the first zone is a first variable air volume (VAV) box configured to receive air from an air handler unit (AHU), where the second pieces of building equipment associated with the second zones are second VAV boxes configured to receive air from the AHU.

In some embodiments, the parameter is a zone temperature (ZNT) and the first time-series data set includes a first values for the ZNT and the second time-series data sets each include a second values for the ZNT. In some embodiments, the method further includes determining a first time-to-setpoint value for the first VAV box and second time-to-setpoint values for the second VAV boxes based on the first ZNT values of first time-series data set and the second ZNT values of the second time-series data sets, determining whether the first time-to-setpoint value and the second time-to-setpoint values are greater than a predefined amount, and generating an AHU recommendation in response to determining that the first time-to-setpoint value and the second time-to-setpoint values are greater than the predefined amount, wherein the AHU recommendation includes an indication to perform maintenance on the AHU.

In some embodiments, the parameter of the first VAV box is an airflow parameter, where the first time-series data set includes a value for the airflow parameter and each of the second time-series data sets includes values for the airflow parameter, wherein the first airflow parameter includes at least one of a differential pressure parameter and an airflow rate parameter. In some embodiments, comparing the first time-series data set with the second time-series data sets includes determining an airflow threshold based on the values for the airflow parameter of each of the second time-series data sets and determining that the first VAV box is not operating properly in response to determining that value of the airflow parameter for the first time-series data set is greater than the airflow threshold. In some embodiments, the recommendation includes a recommendation to close a door or window within the first zone.

Another implementation of the present disclosure is a building controller for predicting a performance of building equipment and controlling the building equipment. The controller includes a processing circuit configured to operate the building equipment to control an environmental condition within a building including a first zone and second zones, receive a first time-series data set for a parameter of a first piece of building equipment associated with the first zone, and receive second time-series data sets for the parameter of second pieces of building equipment associated with the second zones. The first piece of building equipment associated with the first zone is a first variable air volume (VAV) box configured to receive air from an air handler unit (AHU), where the second pieces of building equipment associated with the second zones are second VAV boxes configured to receive air from the AHU. The processing circuit is configured to performing a comparison comparing the first time-series data set with the second time-series data sets and generate recommendations for improving the performance of the first piece of building equipment based on the comparison of the first time-series data set with the second time-series data sets.

In some embodiments, the parameter is a zone temperature (ZNT) and the first time-series data set includes a first values for the ZNT and the second time-series data sets each include a second values for the ZNT. In some embodiments, the processing circuit is configured to determine a first time-to-setpoint value for the first VAV box and second time-to-setpoint values for the second VAV boxes based on the first ZNT values of first time-series data set and the second ZNT values of the second time-series data sets, determine whether the first time-to-setpoint value and the second time-to-setpoint values are greater than a predefined amount and generate an AHU recommendation in response to determining that the first time-to-setpoint value and the second time-to-setpoint values are greater than the predefined amount, wherein the AHU recommendation includes an indication to perform maintenance on the AHU.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
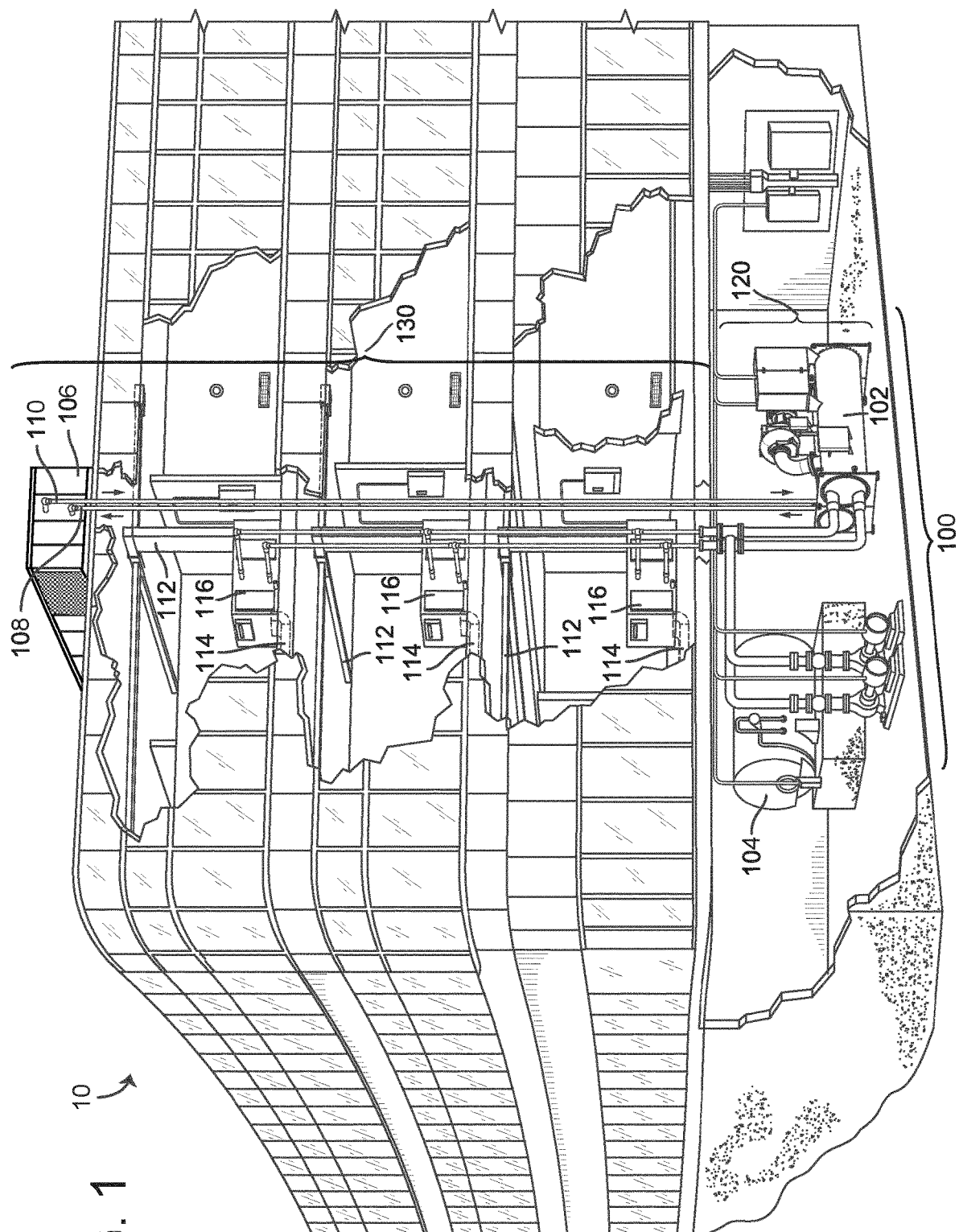
FIG. 1 is a drawing of a building equipped with a HVAC system, according to an exemplary embodiment.

Referring generally to the FIGURES, systems and methods for predicting performance of building equipment via a thermostat are shown, according to various exemplary embodiments. In a building, various zones may be defined where environmental conditions of each zone are controlled by building equipment located in the zone or otherwise associated with the zone. For example, in the building, an air handler unit (AHU) may heat or cool air for the entire building. In each zone, a variable air volume (VAV) device may receive heated or cooled air from the AHU where a thermostat can control the VAV to heat or cool the zone.

Since each zone may have its own VAV (and the VAV devices may be similar and/or the same model), it would be expected that the performance of each VAV device would be similar. However, if the performance of one of the VAV devices deviates from the performance of the other VAV devices, a thermostat communicably coupled to the VAV devices can be configured to analyze VAV data to identify various performance improving recommendations for a VAV device that experiences a deviation in performance. Some examples of performance improving recommendations may be to adjust operating parameters of a VAV device, perform preventative maintenance to prevent a failure of the VAV device, notify a user to close doors or windows in the zone associated with the VAV device, and/or other recommendations described in further detail elsewhere herein. Determinations as to whether a door or window is open based on comparisons between multiple similar devices can advantageously determine whether a door or window is open without requiring the installation and monitoring of door and window sensors.

In some embodiments described herein, a thermostat located within the building is configured to analyze the VAV data and generate the recommendations. In various embodiments, a cloud server can be configured to analyze the VAV data and generate the recommendations. However, it may be advantageous to implement the analysis and recommendation generation on the thermostat and analysis and recommendation tuning on the server. Often, providing local building data to a server, analyzing the building data by the server, and then generating the recommendations by the server can cause a substantial delay in the analysis and generation of recommendations. It may be quicker to analyze the data locally, by the thermostat. However, various analysis techniques (e.g., deep learning techniques) may require intensive processing and data storage requirements. In this regard, a server can be configured to identify improvements to an analysis method performed by the thermostat while the thermostat can be configured to run the analysis. This allows for quick response locally by the thermostat and resource intensive analysis implemented by the server.

In some embodiments, the analysis implemented by the thermostat is rule based. For example, the thermostat can be configured to store a set of performance rules and compare the building data to the performance rules. For example, one rule may be to monitor the time it takes to reach an environmental setpoint for a zone. If the time-to-setpoint is substantially long (e.g., longer than a predefined amount or longer than a time-to-setpoint average determined for all zones), the thermostat can be configured to determine that a VAV unit associated with a particular zone is experiencing an issue. However, if all zones (or a predefined number of zones) are experiencing a time-to-setpoint longer than a predefined amount, the thermostat may determine that an AHU unit servicing all the zones is not functioning properly. Another rule may be to compare outdoor air temperature (OAT) to a zone temperature (ZNT) for a particular zone. If the ZNT is at a value within a predefined amount from the OAT and the equipment for the zone is operating, the thermostat can be configured to determine that a window or door is open in the zone.

Another example of the analysis that the thermostat can be configured to perform is to compare various parameters (e.g., VAV parameters, room temperature parameters, control settings of a control device of the VAV, etc.) via an analysis metric. The analysis metric may be used to identify outliers in a group of building devices and/or can be applied to the aforementioned analysis rules. The analysis metric may be an average or an exponentially weight moving average (EWMA). The EWMA may be a moving average that weights the most recent data samples of a time-series data set the greatest. In this regard, the EWMA may respond quickly to changes in parameter values. An EWMA can be determined for various parameters of a zone and compared with other EWMA determinations for other zones. In this regard, deviations in the EWMA can be used by the thermostat to identify whether a zone is experiencing, or will experience, a fault. In some embodiments, the thermostat can use various analysis rules with EWMA values to determine performance improving recommendations.

Building Management System and HVAC System

Figure 2:
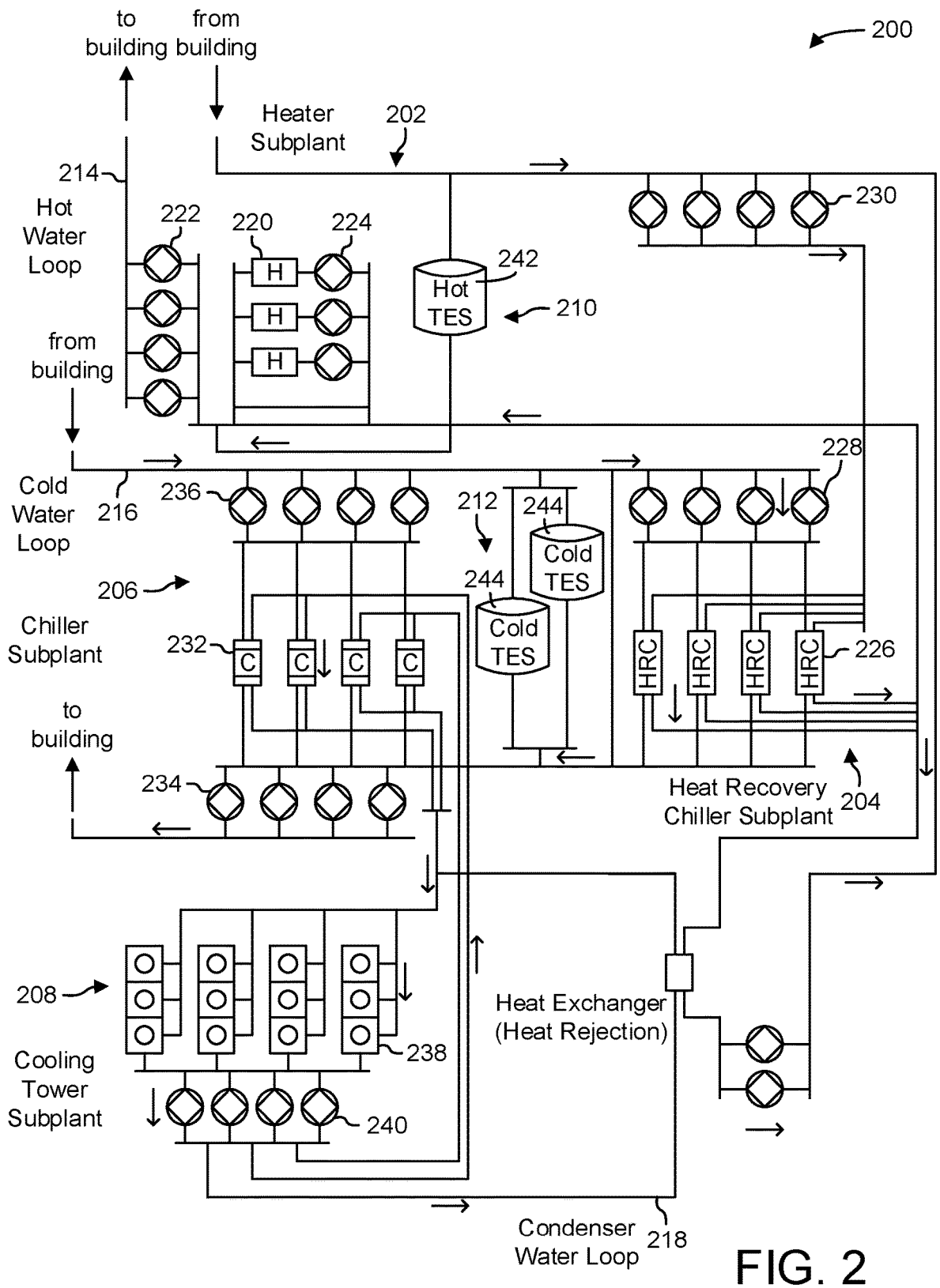
FIG. 2 is a block diagram of a waterside system that may be used in conjunction with the building of FIG. 1, according to an exemplary embodiment.
Figure 3:
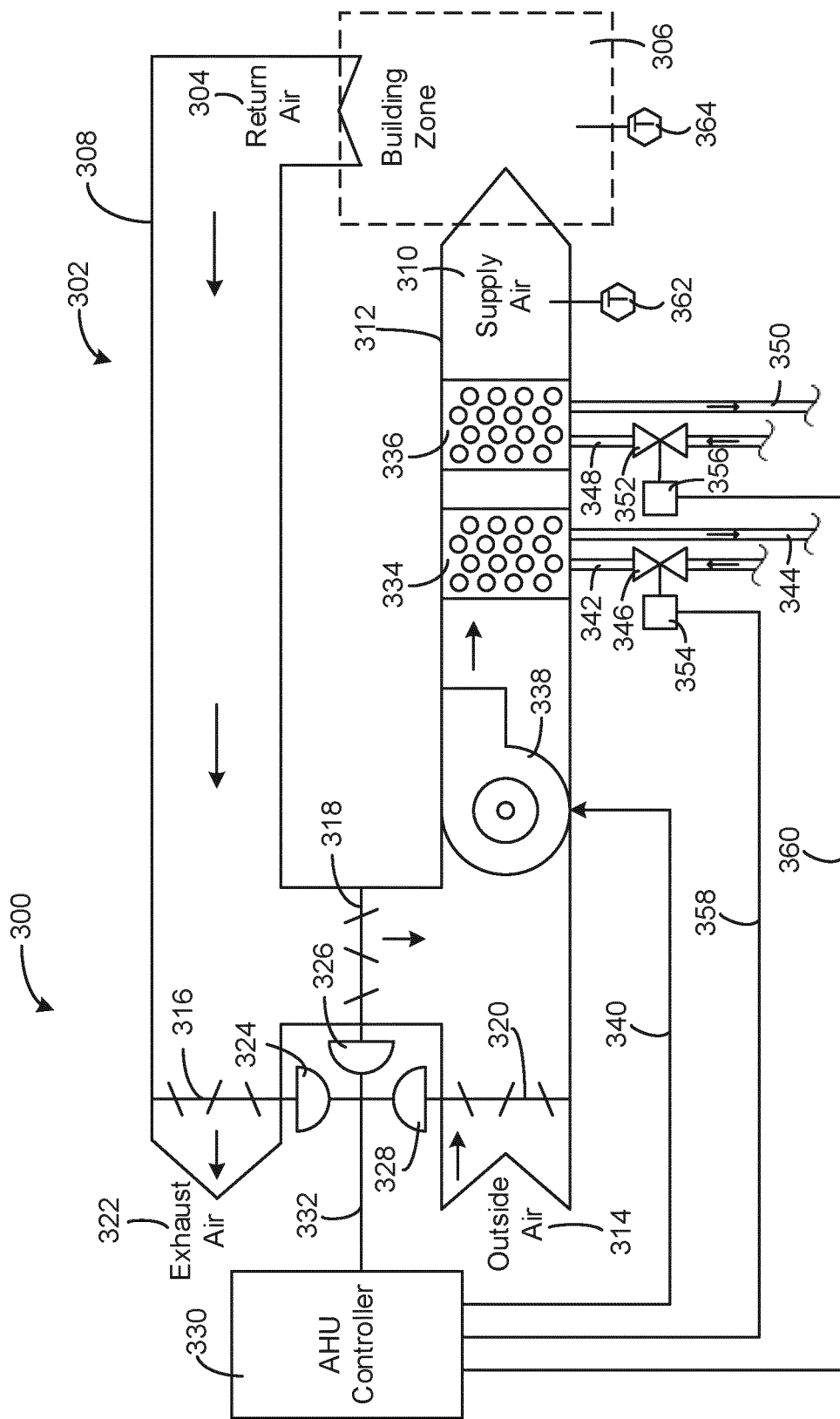
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Residential HVAC System

Figure 4:
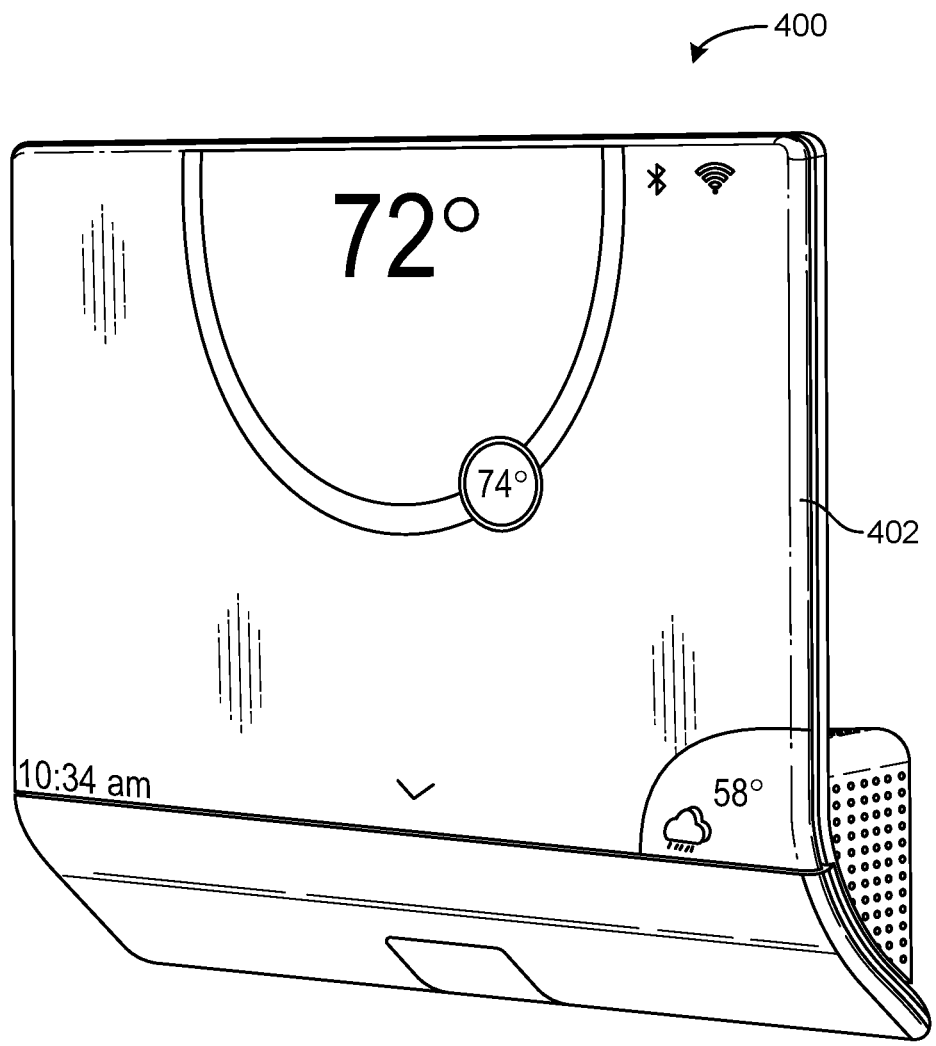
FIG. 4 is a drawing of a cantilevered thermostat with a transparent display, according to an exemplary embodiment.

Referring now to FIG. 4, a drawing of a thermostat 400 for controlling building equipment is shown, according to an exemplary embodiment. The thermostat 400 is shown to include a display 402. The display 402 may be an interactive display that can display information to a user and receive input from the user. The display may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The display 402 can be a touchscreen or other type of electronic display configured to present information to a user in a visual format (e.g., as text, graphics, etc.) and receive input from a user (e.g., via a touch-sensitive panel). For example, the display 402 may include a touch-sensitive panel layered on top of an electronic visual display. A user can provide inputs through simple or multi-touch gestures by touching the display 402 with one or more fingers and/or with a stylus or pen. The display 402 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 402 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Figure 5:
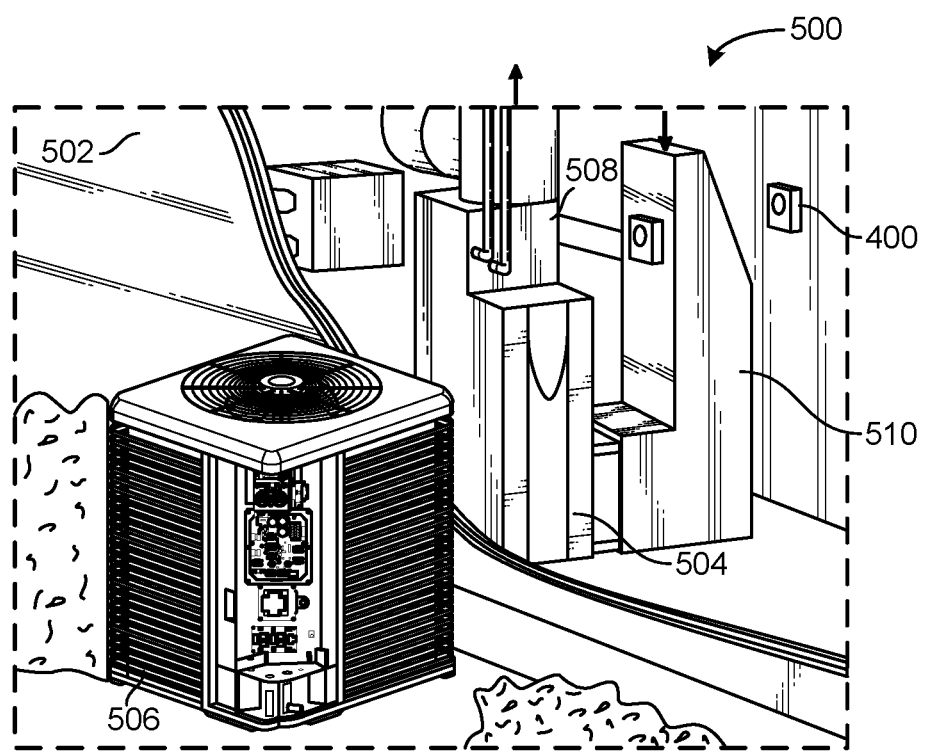
FIG. 5 is a schematic drawing of a building equipped with a residential heating and cooling system and the thermostat of FIG. 4, according to an exemplary embodiment.

Referring now to FIG. 5, a residential heating and cooling system 500 is shown, according to an exemplary embodiment. The residential heating and cooling system 500 may provide heated and cooled air to a residential structure. Although described as a residential heating and cooling system 500, embodiments of the systems and methods described herein can be utilized in a cooling unit or a heating unit in a variety of applications include commercial HVAC units (e.g., roof top units). In general, a residence 502 includes refrigerant conduits that operatively couple an indoor unit 504 to an outdoor unit 506. Indoor unit 504 may be positioned in a utility space, an attic, a basement, and so forth. Outdoor unit 506 is situated adjacent to a side of residence 502. Refrigerant conduits transfer refrigerant between indoor unit 504 and outdoor unit 506, typically transferring primarily liquid refrigerant in one direction and primarily vaporized refrigerant in an opposite direction.

When the system 500 shown in FIG. 5 is operating as an air conditioner, a coil in outdoor unit 506 serves as a condenser for recondensing vaporized refrigerant flowing from indoor unit 504 to outdoor unit 506 via one of the refrigerant conduits. In these applications, a coil of the indoor unit 504, designated by the reference numeral 508, serves as an evaporator coil. Evaporator coil 508 receives liquid refrigerant (which may be expanded by an expansion device, not shown) and evaporates the refrigerant before returning it to outdoor unit 506.

Outdoor unit 506 draws in environmental air through its sides, forces the air through the outer unit coil using a fan, and expels the air. When operating as an air conditioner, the air is heated by the condenser coil within the outdoor unit 506 and exits the top of the unit at a temperature higher than it entered the sides. Air is blown over indoor coil 508 and is then circulated through residence 502 by means of ductwork 510, as indicated by the arrows entering and exiting ductwork 510. The overall system 500 operates to maintain a desired temperature as set by thermostat 400. When the temperature sensed inside the residence 502 is higher than the set point on the thermostat 400 (with the addition of a relatively small tolerance), the air conditioner will become operative to refrigerate additional air for circulation through the residence 502. When the temperature reaches the set point (with the removal of a relatively small tolerance), the unit can stop the refrigeration cycle temporarily.

In some embodiments, the system 500 configured so that the outdoor unit 506 is controlled to achieve a more elegant control over temperature and humidity within the residence 502. The outdoor unit 506 is controlled to operate components within the outdoor unit 506, and the system 500, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 6:
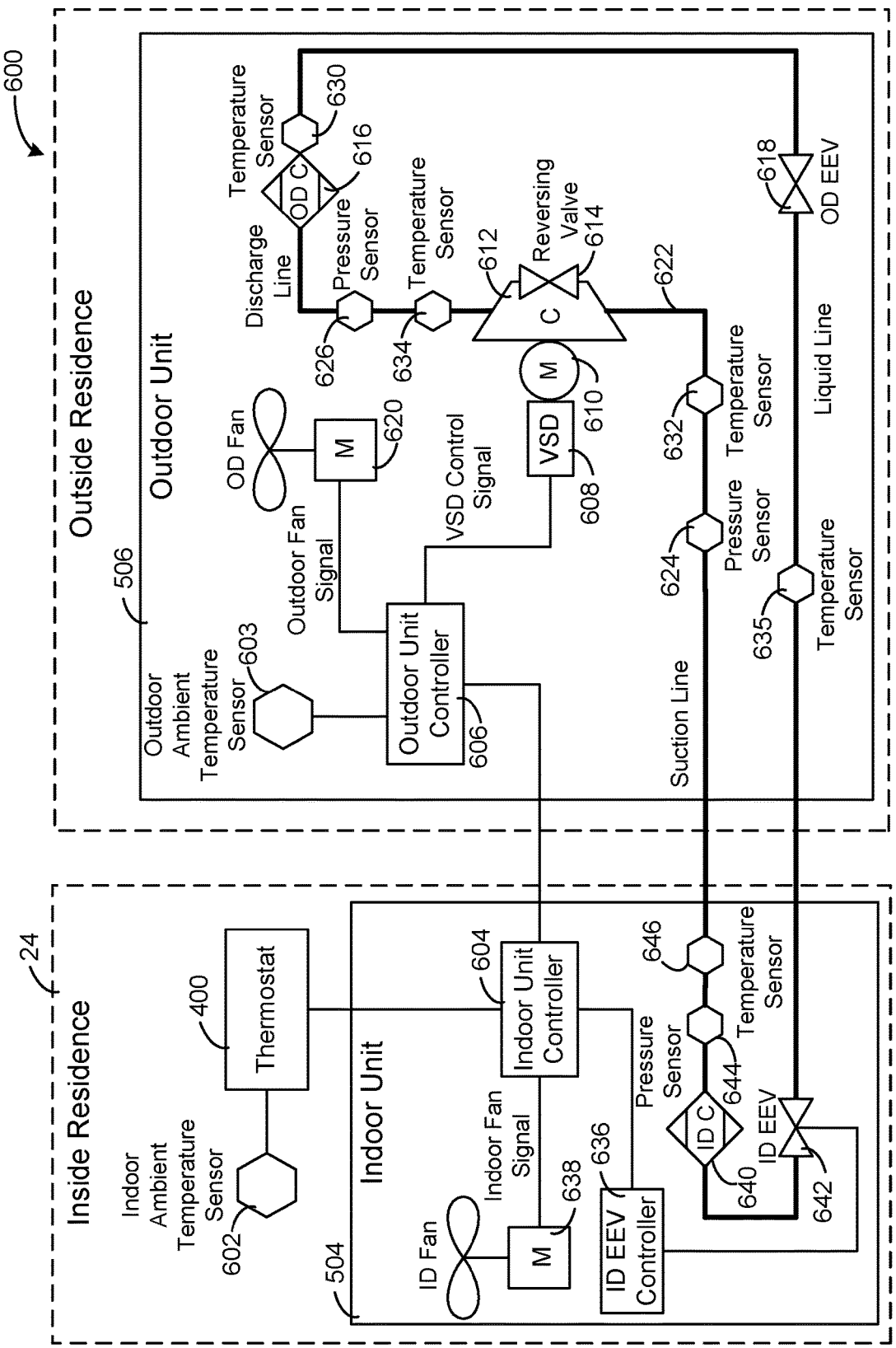
FIG. 6 is a schematic drawing of the thermostat and the residential heating and cooling system of FIG. 4, according to an exemplary embodiment.

Referring now to FIG. 6, an HVAC system 600 is shown according to an exemplary embodiment. Various components of system 600 are located inside residence 502 while other components are located outside residence 502. Outdoor unit 506, as described with reference to FIG. 5, is shown to be located outside residence 502 while indoor unit 504 and thermostat 400, as described with reference to FIG. 6, are shown to be located inside the residence 502. In various embodiments, the thermostat 400 can cause the indoor unit 504 and the outdoor unit 506 to heat residence 502. In some embodiments, the thermostat 400 can cause the indoor unit 504 and the outdoor unit 506 to cool the residence 502. In other embodiments, the thermostat 400 can command an airflow change within the residence 502 to adjust the humidity within the residence 502.

Thermostat 400 can be configured to generate control signals for indoor unit 504 and/or outdoor unit 506. The thermostat 400 is shown to be connected to an indoor ambient temperature sensor 602, and an outdoor unit controller 606 is shown to be connected to an outdoor ambient temperature sensor 603. The indoor ambient temperature sensor 602 and the outdoor ambient temperature sensor 603 may be any kind of temperature sensor (e.g., thermistor, thermocouple, etc.). The thermostat 400 may measure the temperature of residence 502 via the indoor ambient temperature sensor 602. Further, the thermostat 400 can be configured to receive the temperature outside residence 502 via communication with the outdoor unit controller 606. In various embodiments, the thermostat 400 generates control signals for the indoor unit 504 and the outdoor unit 506 based on the indoor ambient temperature (e.g., measured via indoor ambient temperature sensor 602), the outdoor temperature (e.g., measured via the outdoor ambient temperature sensor 603), and/or a temperature set point.

The indoor unit 504 and the outdoor unit 506 may be electrically connected. Further, indoor unit 504 and outdoor unit 506 may be coupled via conduits 622. The outdoor unit 506 can be configured to compress refrigerant inside conduits 622 to either heat or cool the building based on the operating mode of the indoor unit 504 and the outdoor unit 506 (e.g., heat pump operation or air conditioning operation). The refrigerant inside conduits 622 may be any fluid that absorbs and extracts heat. For example, the refrigerant may be hydro fluorocarbon (HFC) based R-410A, R-407C, and/or R-134a.

The outdoor unit 506 is shown to include the outdoor unit controller 606, a variable speed drive 608, a motor 610 and a compressor 612. The outdoor unit 506 can be configured to control the compressor 612 and to further cause the compressor 612 to compress the refrigerant inside conduits 622. In this regard, the compressor 612 may be driven by the variable speed drive 608 and the motor 610. For example, the outdoor unit controller 606 can generate control signals for the variable speed drive 608. The variable speed drive 608 (e.g., an inverter, a variable frequency drive, etc.) may be an AC-AC inverter, a DC-AC inverter, and/or any other type of inverter. The variable speed drive 608 can be configured to vary the torque and/or speed of the motor 610 which in turn drives the speed and/or torque of compressor 612. The compressor 612 may be any suitable compressor such as a screw compressor, a reciprocating compressor, a rotary compressor, a swing link compressor, a scroll compressor, or a turbine compressor, etc.

In some embodiments, the outdoor unit controller 606 is configured to process data received from the thermostat 400 to determine operating values for components of the system 600, such as the compressor 612. In one embodiment, the outdoor unit controller 606 is configured to provide the determined operating values for the compressor 612 to the variable speed drive 608, which controls a speed of the compressor 612. The outdoor unit controller 606 is controlled to operate components within the outdoor unit 506, and the indoor unit 504, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 606 can control a reversing valve 614 to operate system 600 as a heat pump or an air conditioner. For example, the outdoor unit controller 606 may cause reversing valve 614 to direct compressed refrigerant to the indoor coil 508 while in heat pump mode and to an outdoor coil 616 while in air conditioner mode. In this regard, the indoor coil 508 and the outdoor coil 616 can both act as condensers and evaporators depending on the operating mode (i.e., heat pump or air conditioner) of system 600.

Further, in various embodiments, outdoor unit controller 606 can be configured to control and/or receive data from an outdoor electronic expansion valve (EEV) 518. The outdoor electronic expansion valve 518 may be an expansion valve controlled by a stepper motor. In this regard, the outdoor unit controller 606 can be configured to generate a step signal (e.g., a PWM signal) for the outdoor electronic expansion valve 518. Based on the step signal, the outdoor electronic expansion valve 518 can be held fully open, fully closed, partial open, etc. In various embodiments, the outdoor unit controller 606 can be configured to generate step signal for the outdoor electronic expansion valve 518 based on a subcool and/or superheat value calculated from various temperatures and pressures measured in system 600. In one embodiment, the outdoor unit controller 606 is configured to control the position of the outdoor electronic expansion valve 518 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 606 can be configured to control and/or power outdoor fan 620. The outdoor fan 620 can be configured to blow air over the outdoor coil 616. In this regard, the outdoor unit controller 606 can control the amount of air blowing over the outdoor coil 616 by generating control signals to control the speed and/or torque of outdoor fan 620. In some embodiments, the control signals are pulse wave modulated signals (PWM), analog voltage signals (i.e., varying the amplitude of a DC or AC signal), and/or any other type of signal. In one embodiment, the outdoor unit controller 606 can control an operating value of the outdoor fan 620, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 506 may include one or more temperature sensors and one or more pressure sensors. The temperature sensors and pressure sensors may be electrical connected (i.e., via wires, via wireless communication, etc.) to the outdoor unit controller 606. In this regard, the outdoor unit controller 606 can be configured to measure and store the temperatures and pressures of the refrigerant at various locations of the conduits 622. The pressure sensors may be any kind of transducer that can be configured to sense the pressure of the refrigerant in the conduits 622. The outdoor unit 506 is shown to include pressure sensor 624. The pressure sensor 624 may measure the pressure of the refrigerant in conduit 622 in the suction line (i.e., a predefined distance from the inlet of compressor 612). Further, the outdoor unit 506 is shown to include pressure sensor 626. The pressure sensor 626 may be configured to measure the pressure of the refrigerant in conduits 622 on the discharge line (e.g., a predefined distance from the outlet of compressor 612).

The temperature sensors of outdoor unit 506 may include thermistors, thermocouples, and/or any other temperature sensing device. The outdoor unit 506 is shown to include temperature sensor 630, temperature sensor 632, temperature sensor 634, and temperature sensor 636. The temperature sensors (i.e., temperature sensor 630, temperature sensor 632, temperature sensor 635, and/or temperature sensor 646) can be configured to measure the temperature of the refrigerant at various locations inside conduits 622.

Referring now to the indoor unit 504, the indoor unit 504 is shown to include indoor unit controller 604, indoor electronic expansion valve controller 636, an indoor fan 638, an indoor coil 640, an indoor electronic expansion valve 642, a pressure sensor 644, and a temperature sensor 646. The indoor unit controller 604 can be configured to generate control signals for indoor electronic expansion valve controller 642. The signals may be set points (e.g., temperature set point, pressure set point, superheat set point, subcool set point, step value set point, etc.). In this regard, indoor electronic expansion valve controller 636 can be configured to generate control signals for indoor electronic expansion valve 642. In various embodiments, indoor electronic expansion valve 642 may be the same type of valve as outdoor electronic expansion valve 618. In this regard, indoor electronic expansion valve controller 636 can be configured to generate a step control signal (e.g., a PWM wave) for controlling the stepper motor of the indoor electronic expansion valve 642. In this regard, indoor electronic expansion valve controller 636 can be configured to fully open, fully close, or partially close the indoor electronic expansion valve 642 based on the step signal.

Indoor unit controller 604 can be configured to control indoor fan 638. The indoor fan 638 can be configured to blow air over indoor coil 640. In this regard, the indoor unit controller 604 can control the amount of air blowing over the indoor coil 640 by generating control signals to control the speed and/or torque of the indoor fan 638. In some embodiments, the control signals are pulse wave modulated signals (PWM), analog voltage signals (i.e., varying the amplitude of a DC or AC signal), and/or any other type of signal. In one embodiment, the indoor unit controller 604 may receive a signal from the outdoor unit controller indicating one or more operating values, such as speed for the indoor fan 638. In one embodiment, the operating value associated with the indoor fan 638 is an airflow, such as cubic feet per minute (CFM). In one embodiment, the outdoor unit controller 606 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 604 may be electrically connected (e.g., wired connection, wireless connection, etc.) to pressure sensor 644 and/or temperature sensor 646. In this regard, the indoor unit controller 604 can take pressure and/or temperature sensing measurements via pressure sensor 644 and/or temperature sensor 646. In one embodiment, pressure sensor 644 and temperature sensor 646 are located on the suction line (i.e., a predefined distance from indoor coil 640). In other embodiments, the pressure sensor 644 and/or the temperature sensor 646 may be located on the liquid line (i.e., a predefined distance from indoor coil 640).

Thermostat With VAV Performance Predictions

Figure 7:
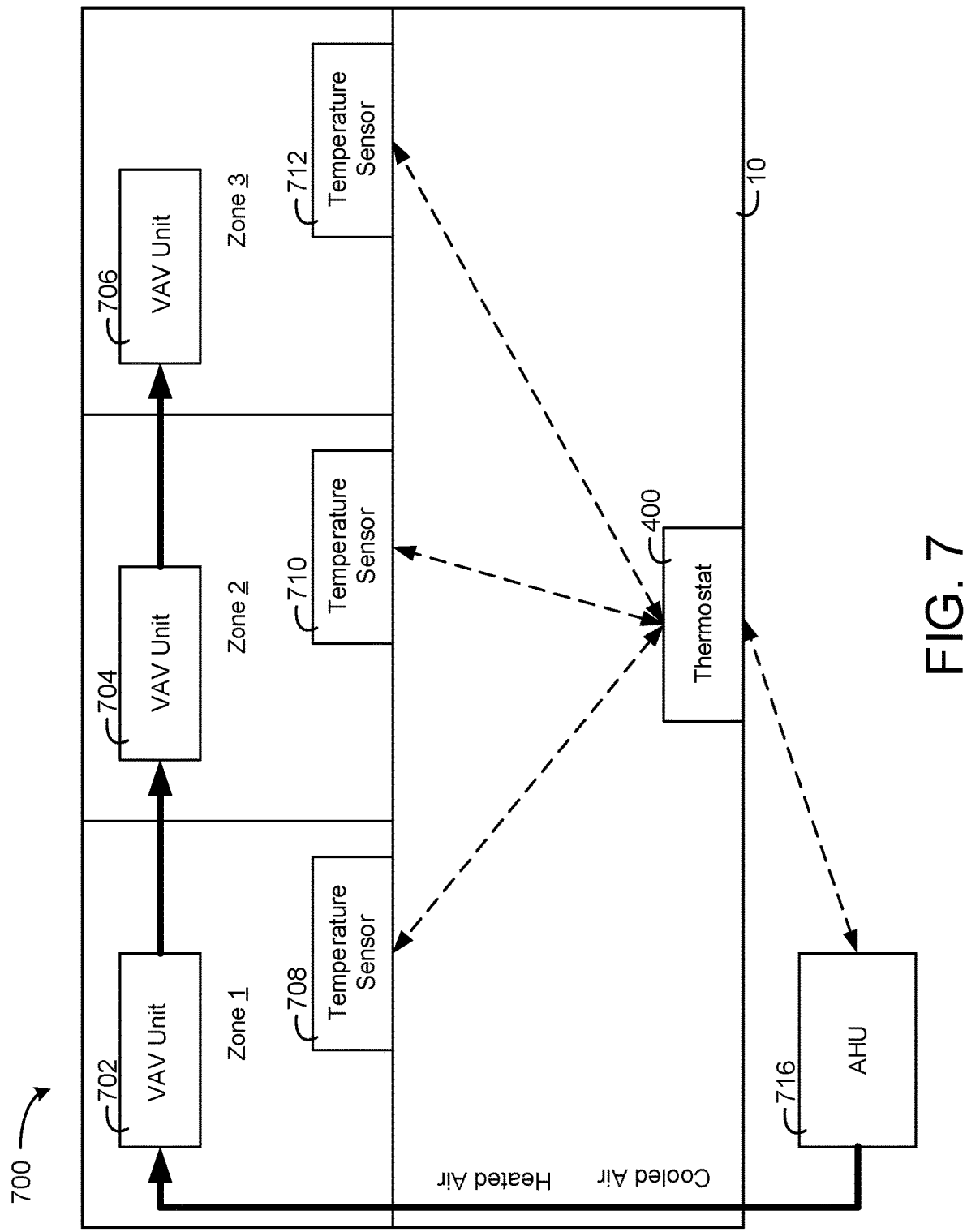
FIG. 7 is a block diagram of the building of FIG. 1 illustrating the thermostat of FIG. 4 controlling an air handler unit (AHU) and variable air volume (VAV) units for various zones of the building of FIG. 1, according to an exemplary embodiment.

Referring now to FIG. 7, a system 700 including a thermostat 400 communicating to multiple VAV units of multiple zones is shown, according to an exemplary embodiment. In FIG. 7, three zones are shown in the building 10, zone 1, zone 2, and zone 3. Each of the zones 1-3 are shown to be associated with a VAV unit. Zone 1 is shown to be associated with VAV unit 702, Zone 2 to be associated with VAV unit 704, while zone 3 is shown to be associated with VAV unit 706. Each of the VAV units 702-706 are shown to receive heated and/or cooled air from AHU 716 and control the environmental conditions of the each of the zones 1-3 of the building 10. The zones 1-3 can be areas of a building, conference rooms, offices, a hotel room, a dorm room, etc. In some embodiments, rather than (or in addition to) including a VAV unit in each of the zones 1-3, the zones may have a zone air conditioner or a zone heater.

The AHU 716 can be configured to circulate air throughout the building 10 and can be configured to heat and/or cool the air that it is configured to circulate. In some embodiments, the AHU 716 is located on a rooftop of the building 10, a roof top unit (RTU). The AHU 716 can be the same as and/or similar to the AHU 106 as described with reference to FIG. 1.

The thermostat 400 can be configured to control the AHU 716 and control how the AHU 716 controls the environmental conditions of the building 10. Furthermore, the thermostat 400 can be configured to control the VAV units 702-706 and control how each of the VAV units 702-706 controls the environmental conditions of the zones 1-3. The thermostat 400 can be configured to receive temperature or VAV unit data from the temperature sensors 708-712. Each of the temperature sensors 708-712 can be remote temperature sensors or thermostats (e.g., the same as and/or similar to the thermostat 400). The temperature sensors 708-712 can provide the thermostat 400 with data for the zones 1-3 and, in some cases, control the VAV units 702-706 on behalf of the thermostat 400. Based on data received for each of the zones 1-3, the thermostat 400 can be configured to control the AHU 716 and/or the VAV units 702-706.

The thermostat 400 can be configured to receive data from the zones 1-3 and utilize the data to generate performance recommendations and/or generate control signals for the AHU 716 and/or VAV units 702-706. The thermostat 400 can be configured to perform rule based analysis and/or statistical analysis to compare the performance of each of the zones 1-3 to determine the recommendations or control signals. The zones 1-3 may be expected to behave in the same manner. However, some zones may perform differently, for example, inside rooms versus rooms with windows, corner rooms, rooms on the sun side of the building versus rooms on the shade side may perform differently. The thermostat 400 can be configured to compare the performance of similar zones, or model the zones such that differences are accounted for, to perform analysis on the zones 1-3 as a group to identify differences in the performance of each zone and determine recommendations for improving the performance of any zone not operating properly.

In some embodiments, the thermostat 400 can be configured to group and analyze data for like zones together. For example, the thermostat 400 could receive VAV data for five conference rooms each with a single window and two corner offices. The thermostat 400 can be configured to group the data for the conferences rooms together and analyze the conference room data to identify performance updates for the conference room equipment. Furthermore, the thermostat 400 can be configured to group the data for the two corner offices and perform analysis on the corner office data group to determine recommendations for equipment of the corner office rooms.

Figure 8:
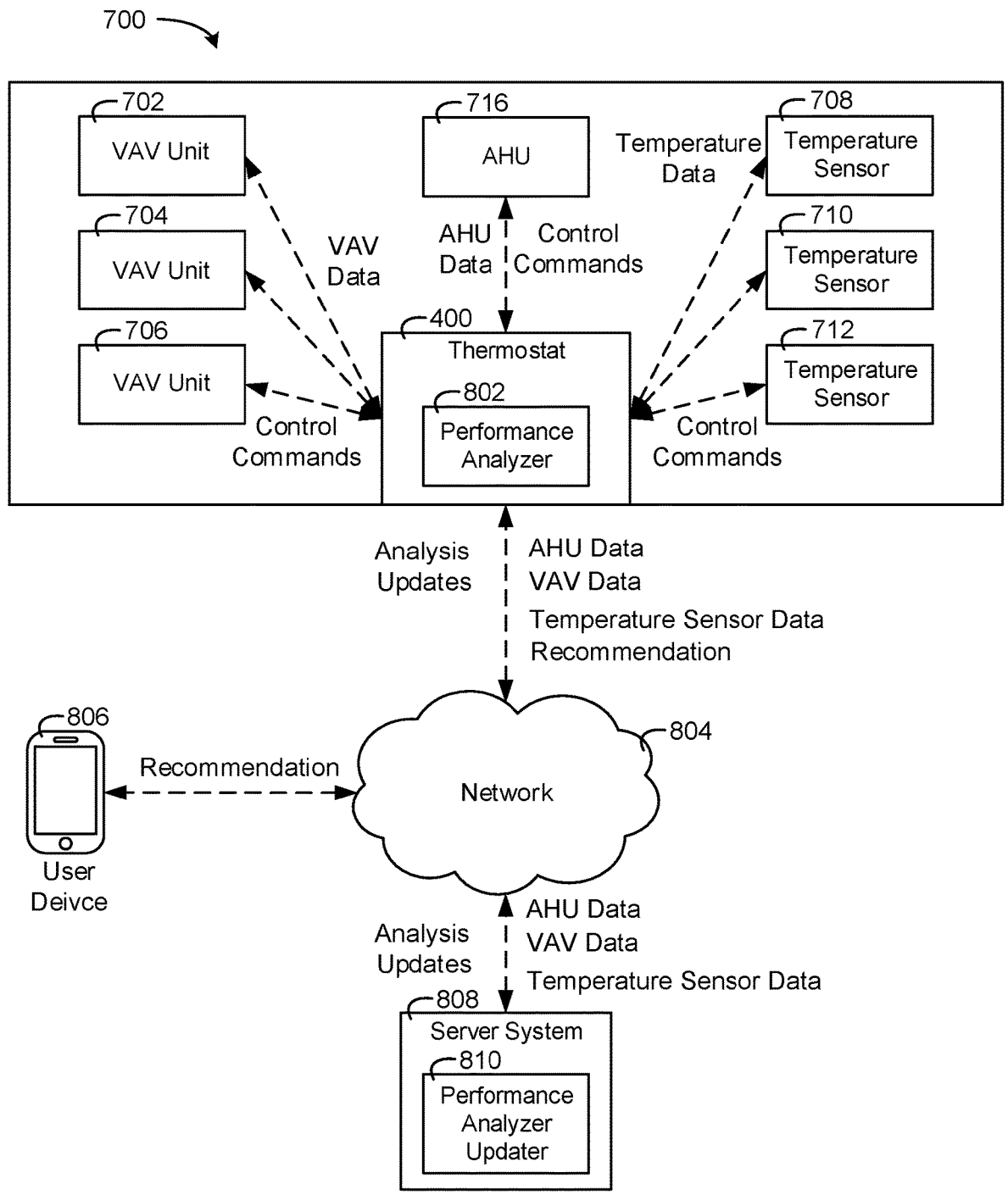
FIG. 8 is a block diagram of the thermostat of FIG. 4 performing analysis on building equipment and performing off premises analysis updates via a server system, according to an exemplary embodiment.

Referring now to FIG. 8, the system 700 is shown to include communication between the thermostat 400, a user device, and a server system, according to an exemplary embodiment. The thermostat 400 is shown to receive VAV data from the VAV units 702-706 and is further shown to control the VAV units 702-706. Similarly, the thermostat 400 is shown to receive AHU data from the AHU 716 and issue control commands to the AHU 716. Furthermore, the thermostat is shown to receive temperature data from the temperature sensors 708-712 and issue control commands to the temperature sensors 708-712.

The thermostat 400 is shown to include a performance analyzer 802 which can be a circuit, processing circuit (e.g., processor and memory), software module, etc. configured to analyze the data received from the VAV units 702-706, the AHU 716, and/or the temperature sensors 708-712 to generate recommendations and/or generate parameter updates to control the VAV units 702-706, the AHU 716, and/or the temperature sensors 708-712. The performance analyzer 802 can use rule based determinations or statistical determinations to generate the recommendation and the parameter updates. The performance analyzer 802 is shown and described in greater detail with reference to FIGS. 9-11.

The thermostat 400 can be configured to generate recommendations via the performance analyzer 802. These recommendations can be displayed to a user of the thermostat via a user interface of the thermostat 400 (e.g., the display 402 of the thermostat 400). Furthermore, the recommendations can be transmitted to a user device 806 via a network 804.

Figure 13:
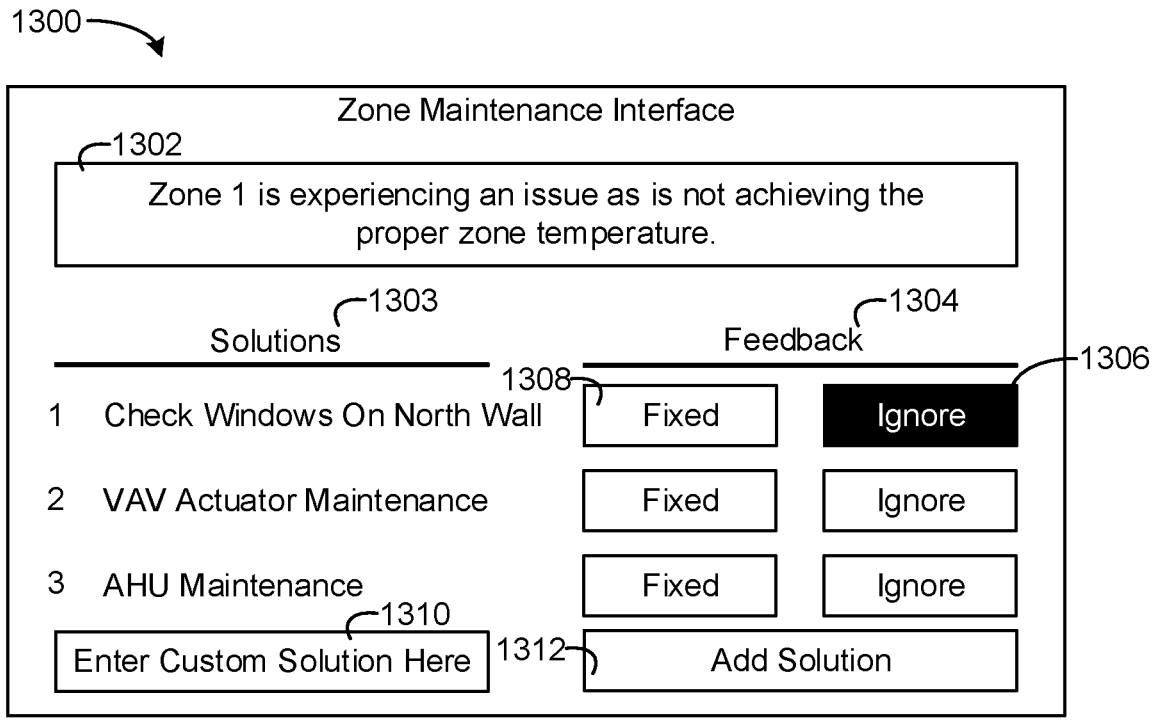
FIG. 13 is a drawing of an interface displaying recommendations for performing improvements determined by the thermostat of FIG. 4 based on time-series data for building equipment, according to an exemplary embodiment.
Figure 14:
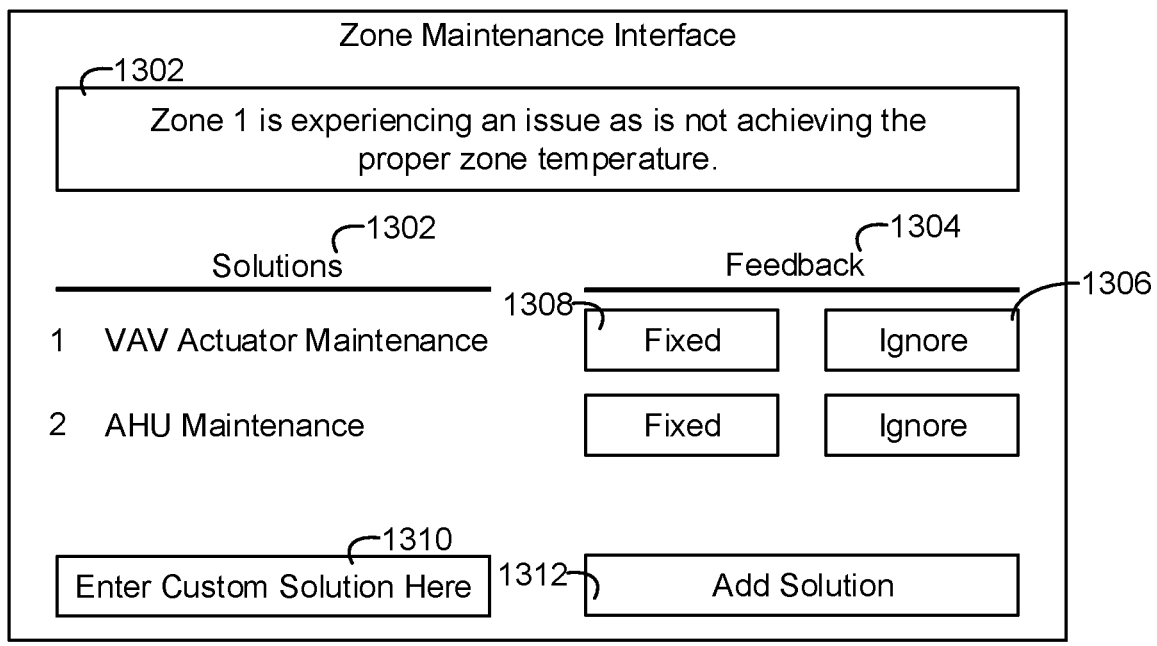
FIG. 14 is a drawing of the interface of FIG. 13 where a user has ignored one of the recommendations of the interface, according to an exemplary embodiment.

The user device 806 may be a laptop computer, a mobile phone, a tablet, a desktop computer, and/or any other device with a display screen for presenting a user with a recommendation generated by the performance analyzer 802. Both the user device 806 and/or the thermostat 400 can be configured to display the recommendation to the user. The user device 806 can include a user interface similar to or the same as the display 402 of the thermostat 400 as described with reference to FIG. 4. Examples of an interface that either the user device 806 and/or the thermostat 400 can be configured to generate and/or display is shown in FIGS. 13-14.

FIG. 8 is shown to include a server system 808. The thermostat 400 can be configured to provide various zone and/or building data, e.g., the AHU data, the VAV data, environmental data of the temperature sensors 708-712, control settings of the thermostat 400 for the VAV units 702-706 and/or the AHU 716 to the server system 808. The server system 808 is shown to include performance analyzer updater 810. The performance analyzer updater 810 can be a circuit and/or a software module implemented on a processing circuit. The server system 808 can be and/or include a processing circuit, processor, and/or memory that can implemented the performance analyzer updater 810 (e.g., the processing circuit of the thermostat 400 as described with reference to FIG. 10).

The performance analyzer updater 810 can be configured to analyze the data received from the thermostat 400 and generate analysis updates for the performance analyzer 802. These analysis updates can improve the analysis performed by the performance analyzer 802 by generating new analysis rules and/or updating current analysis rules. Furthermore, the performance analyzer updater 810 can generate new rules for determining the recommendations. The performance analyzer updater 810 and/or the server system 808 can be and/or can be configured to user various Internet of Things (IoT) platforms and services, e.g., MICROSOFT AZURE, IoT EDGE, etc.

In some embodiments, the performance analyzer updater 810 can receive regional information from the thermostat 400 or another device associated with the building 10 (e.g., an on premises building automation system, an off-premises building automation server, a weather server, etc.). The data can include thermal efficiency of various areas of the building 10 (e.g., the zones 1-3), outdoor air data (e.g., outdoor temperature, outdoor air quality, etc.), power consumption of the building 10, etc. This data can be used by the performance analyzer updater 810 in improving the performance of the thermostat 400. In some embodiments, the thermostat 400 transmits data to the server system 808 dynamically. When certain events occur, e.g., an analysis rule triggers, a parameter reaches a value above and/or below a predefined amount, the thermostat 400 can send additional data to the server system 808. For example, the thermostat 400 could send data to the server system 808 hourly, however, if an airflow rate of one VAV becomes a predefined amount greater than airflow rates for other VAV units, the thermostat 400 may transmit data to the server system 808 every ten minutes.

The thermostat 400, the user device 806, and the server system 808 are shown to communicate via a network 804. In some embodiments, the network 804 communicatively couples the devices, systems, and servers of system 700. In some embodiments, the network 804 is at least one of and/or a combination of a Wi-Fi network, a wired Ethernet network, a Zigbee network, a Bluetooth network, and/or any other wireless network. The network 804 may be a local area network and/or a wide area network (e.g., the Internet, a building WAN, etc.) and may use a variety of communications protocols (e.g., BACnet, IP, LON, etc.). The network 804 may include routers, modems, and/or network switches. The network 804 may be a combination of wired and wireless networks.

Figure 9:
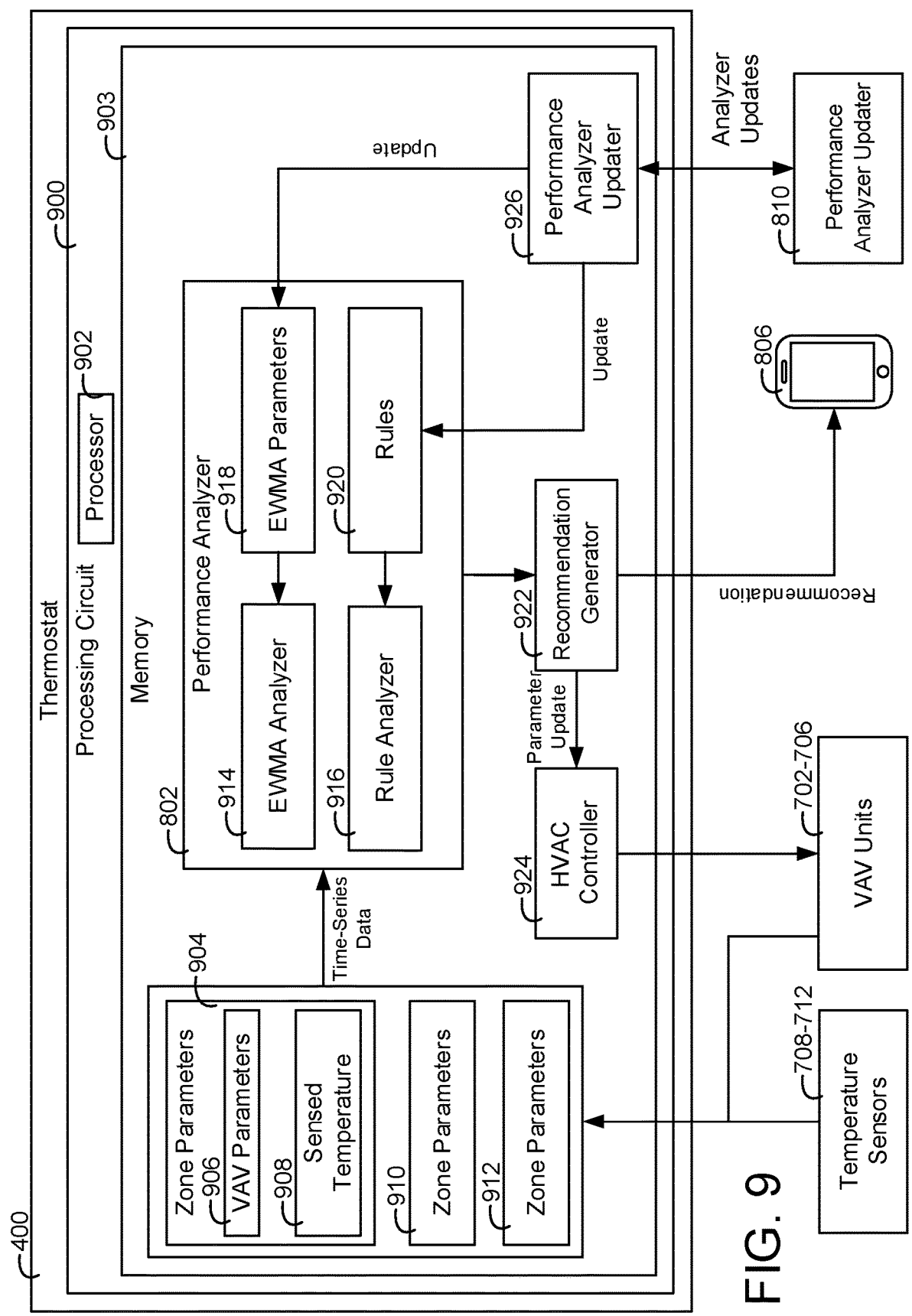
FIG. 9 is a block diagram of the thermostat of FIG. 4 illustrating the components of the thermostat configured to perform analysis on time-series data of the building equipment of FIG. 8 to improve the performance of the building equipment, according to an exemplary embodiment.

Referring now to FIG. 9, a block diagram of the thermostat 400 is shown describing the thermostat 400 in greater detail, according to an exemplary embodiment. The thermostat 400 is shown to include a processing circuit 900 including a processor 902 and a memory 903. The processor 902 can be implemented as a general purpose processor, an application specific integrated circuit (ASIC), one or more field programmable gate arrays (FPGAs), a group of processing components, or other suitable electronic processing components. The memory 903 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 903 can be or include volatile memory and/or non-volatile memory. The memory 903 can include object code components, script components, or any other type of information structure for supporting the various activities and information structures described in the present application. According to some embodiments, the memory 903 is communicably connected to the processor 902 via the processing circuit 900 and can include computer code for executing (e.g., by the processing circuit 900 and/or the processor 902) one or more processes of functionality described herein.

In FIG. 9, the memory 903 is shown to include zone parameters for the zones 1-3 as described with reference to FIG. 7. The zone parameters 904 may be data for the zone 1, while the zone parameters 910 may be data for the zone 2. Finally, the data for the zone 3 may be stored as the zone parameters 912. The data can be stored as time-series data sets for each of the zones 1-3. The zone parameters 904 are shown to include VAV parameters 906 and sensed temperature 908 for the zone 1.

The VAV parameters 906 may be parameters of the VAV unit 702 as described with reference to FIG. 7. The parameters can include zone temperature, discharge air temperature, a temperature setpoint, a humidity value, an actuator position value, a heating coil actuator potion value, a dehumidifier setpoint, etc. VAV parameters 906 may be time-series data received from the VAV unit 702. Likewise, the sensed temperature 908 may be the temperature sensed by the zone 1 by the temperature sensor 708. The zone parameters 904 can further included various commands that the thermostat 400 (or the temperature sensor 708) has generated for the VAV unit 702. Furthermore, the zone parameters 904 can include data of the temperature sensors 708-712. For example, the temperature sensors 708-712 can record volatile organic compounds (VOCs), bio organic compounds (BOCs), carbon dioxide ($CO2$), occupancy data, number of times a user adjusts a setpoint, etc. In some embodiments, the thermostat 400 can be configured to cycle air through a particular zone based on the levels of VOCs, CO2, and/or BOCs.

The data for the zone parameters 904, 910, and 912 may be time-series data sets that can be provided to the performance analyzer 802. The performance analyzer 802 can be configured to analyze the time-series data received and cause a recommendation generator 922 to generate recommendations and/or can cause the recommendation generator 922 to generate parameter updates for the VAV units 702-706 and/or the AHU 716. The performance analyzer 802 can be configured to determine the performance of each of the zones 1-3 based on the time-series data received for each zone. The performance analyzer 802 can be configured to determine the performance of each of the zones 1-3 based on an EWMA analyzer 914 and/or a rule analyzer 916.

The EWMA analyzer 914 can be configured to determine an EWMA value for each parameter received based on the time-series for said parameter. EWMA is a type of infinite impulse response (IIR) filter where the output of the filter depends on previous inputs to the filter (e.g., is a recursive filter). The EWMA value may be determine from the following equation, $$S_t = \begin{cases} Y_1, & t = 1 \\ \alpha \cdot Y_1 + (1 - \alpha) \cdot S_{t-1}, & t > 1 \end{cases} \quad \text{(Equation 1)}$$

where the coefficient α represents the degree of weighting decreases (a constant smoothing factor between 0 and 1). A higher value for α discounts older observations faster while a lower value of a discounts older observations slower. The variable $Y_1$ is the value at a time period t, for example the value of a parameter of a time-series data set. The value $S_t$ is the value of the EWMA at any time period t.

The EWMA analyzer 914 can be configured to generate an EWMA value for a parameter of one zone and compare the EWMA value or set of EWMA values, to EWMA values for other zones. For example, the EWMA for zone 1 could be compared to the EWMA for zone 2 and zone 3 for discharge air temperature (DAT) of the VAV units 702-706. The EWMA analyzer 914 can be configured to compare the EWMA DAT values for zone 1 to the EWMA DAT values for zones 2 and 3 to determine whether the EWMA DAT for zone 1 is an outlier. For example, a combined EWMA DAT could be determined for zones 1-3 and the EWMA DAT for zone 1 could be compared to the combined EWMA DAT value to determine whether the EWMA DAT for zone 1 is a predefined amount greater and/or less than the combined EWMA DAT. The EWMA analyzer 914 can compare multiple parameters with the zones 1-3 to determine, based on the multiple comparisons, whether a zone or zone equipment is experiencing a fault or will experience a fault.

One example may be comparing an EWMA ZNT for zone 1 and a setpoint for zone 1 with EWMA ZNT values for zones 2-3 and setpoint values for zones 2-3. If the EWMA ZNT value for zone 1 is less than the EWMA ZNT values for zones 2-3 (e.g., a predefined amount less) and the EWMA setpoint for the zone 1 is less than the EWMA setpoint for zones 2-3 (e.g., a predefined amount), this may indicate that the setpoint for zone 1 is not properly set. In this regard, the performance analyzer 802 can generate a parameter update for the setpoint of zone 1 and can be configured to control the VAV unit 702 based on the updated setpoint.

In some embodiments, the EWMA analyzer 914 can be configured to generate EWMA time series data sets based on time-series data sets received for the zone parameters 904, the zone parameters 910, and/or the zone parameters 912. The EWMA analyzer 914 can provide the EWMA time-series data sets to the rule analyzer 916. The rule analyzer 916 can then analyze he EWMA time-series data sets via rules 920 by the rule analyzer 916.

The EWMA analyzer 914 is shown to include EWMA parameters 918. The EWMA parameters 918 may be parameters for generating an EWMA value, e.g., the coefficient α, or can control how EWMA values are compared. The EWMA parameters 918 are shown receive updates from a performance analyzer updater 926. The performance analyzer updater 926 can be configured to receive analyzer updates determined by the performance analyzer updater 810 of the server system 808 so that the analysis performed by the EWMA analyzer 914 dynamically adapts to machine learning that the server system 808 can be configured to perform.

The performance analyzer 802 is shown to include a rule analyzer 916 that can be configured to perform rule based analysis of the time-series data. The rules 920 may be used in place of, or in addition to, the analysis performed by the EWMA analyzer 914. The rule analyzer 916 can be configured to use various rules to determine whether a window is open in a zone, whether one of the VAV units 702-706 is not functioning, and/or whether the AHU 716 is not functioning. The rule analyzer 916 is shown to receive the rules 920 and utilize the rules 920 in determining the performance determinations. The performance analyzer updater 926 can be configured to receive new rules and/or rule updates from the performance analyzer updater 810. The server system 808 can be configured to perform various analysis techniques on received data to update and/or create new rules.

Time-To-Setpoint AHU Rule

The AHU rule may be a rule of the rules 920 where the rule analyzer 916 determines that there is a performance issue with the AHU 716. In this rule, the rule analyzer 916 can be configured to receive time-series data for the ZNT values of each of the zones 1-3. The rule analyzer 916 can determine whether the ZNT value for each of the zones 1-3 has reached a particular setpoint for each of the zones 1-3 (e.g., is within a predefined window centered at the setpoint for the zone). If, after a predefined amount of time, none of the zones 1-3 (or a predefined number of the zones 1-3) have not reached the setpoint, the rule analyzer 916 can be configured to determine that there is an issue with the AHU 716. The AHU rule may correspond to a AHU maintenance recommendation that the recommendation generator 922 can be configured to generate in response to the AHU rule triggering. The AHU maintenance recommendation may recommend that maintenance or inspection be performed on the AHU 716 and may further indicate that none of the zones (or a predefined amount of zones) have failed to reach their setpoint in a predefined amount of time.

Time-To-Setpoint VAV Rule

The VAV rule may indicate whether one of the VAV units 702-706 requires maintenance. With the VAV rule, the rule analyzer 916 can be configured to determine, based on time-series data for the VAV units 702-706, whether a temperature value of one of the VAV units is taking long time to achieve a setpoint (e.g., a time-longer than a predefined amount). In some embodiments, the predefined amount is determined based on an average time-to-setpoint determined for all the VAV units 702-706. If one of the VAV units 702-706 is a predefined amount of time less than said average time, then the rule analyzer 916 may determine that there is an issue with the VAV unit or the zone which the VAV unit is located within. The VAV rule may be associated with a recommendation to perform maintenance on a particular VAV unit that did not achieve its setpoint temperature quick enough. Furthermore, the VAV rule can be associated with a recommendation to check whether doors or windows are open in the zone. The recommendation generator 922 can be configured to generate the VAV maintenance recommendation and/or the check windows or doors recommendation in response to the VAV rule triggering.

Airflow VAV Rule

The airflow VAV rule may analyze an airflow value (e.g., differential pressure of a VAV or a flow rate for the VAV) of each of the zones 1-3 to determine whether airflow values of one of the zones deviates from the airflow values of the other zones. The airflow value can be determined by the VAV units 702-706. For example, a differential pressure sensor can measure the pressure of one of the VAV units 702-706. An airflow rate can be determined based on the measured differential pressure. The rule analyzer may identify that the airflow value of zone 1 is a predefined amount greater than the airflow value for the zones 2-3 (e.g., greater than a differential pressure average of zones 1-3). This may indicate that the VAV unit 702 of zone 1 is attempting to satisfy a high load but may be unsuccessful. In response to this determination, and in some embodiments, in response to determining that VAV rule also applies for the zone 1, the rule analyzer 916 can determine that a window or door is open in the zone 1. The recommendation to check windows and/or doors can be generated by the recommendation generator 922 and provided to an end user.

Parameter Update Rule

The parameter update rule can be configured to determine whether a parameter update is necessary for the VAV units 702-706. For example, the rule analyzer 916 can determine whether a time-to-setpoint for each of the VAV units 702-706 is less than a predefined amount. Furthermore, the rule analyzer 916 can determine whether the OAT is greater than a predefined amount or less than a predefined amount. If the OAT is greater than the predefined amount, it may indicate that it is very hot outside and there is a great strain on the equipment serving the zones 1-3. Similarly, if the OAT is less than the predefined amount, it may indicate that it is very cold outside and there is a similar strain on the equipment serving the zones 1-3. In this regard, the rule analyzer 916 can be configured to raise or lower a setpoint temperature for the zones 1-3 so that the equipment serving the zones 1-3 does not run indefinitely and/or become wore out.

Frequent Setpoint Change Rule

The frequent setpoint change rule may analyze the rate at which a setpoint is changed for a zone. For example, if a setpoint is changed at a predefined rate (e.g., more than a predefined number of changes a day, a week, a month, a year, etc.), the rule analyzer 916 can be configured to determine that there is an abnormal condition with the zone. The predefined rate may be based on a normal number of setpoint changes for a set of zones. If the number of setpoint changes for zones 1-3 is on average 15 setpoint changes per week, a setpoint threshold can be determined to be 15 (or 15 plus an offset). If for zone 1, the number of setpoint changes in a week is 30, the rule analyzer 916 can identify that there is a problem with the zone 1. A recommendation for addressing the issue may be to check whether the VAV unit 702 is functioning properly.

The number of times a setpoint changes in a zone may depend on the occupancy of the zone. Zones that have a high occupancy may have their setpoint changed at a greater rate than zones with low occupancy. In this regard, the setpoint frequency of each zone can be adjusted based on occupancy of each zone so that the number of setpoint changes across zones can be compared according to patterns of occupancy.

High Or Low Setpoint Rule

A high or low setpoint rule may be a rule which analyzes whether a setpoint for one zone is a predefined amount greater than or less than setpoints for other zones. If a user increases a setpoint for zone 1 but not for zone 2, this difference in setpoint values may be indicative of the equipment of zone 1 not properly functioning. In this regard, an average setpoint value can be determined for a group of zones, e.g., zones 1-3. If one zone has a setpoint a predefined amount greater than or less than the average (or the average plus an offset), this may be indicative of the equipment for that zone not operating properly. The recommendation generator 922 can be configured to generate a recommendation to perform maintenance on a VAV unit due to high setpoint values and provide the recommendation to an end user for review.

Stuck Damper

Another rule of the rules 920 may be a stuck damper rule that identifies whether a damper of a VAV unit is stuck. The rule may indicate that if a damper of a VAV has not changed by a predefined amount within a previous time period, the damper of said VAV may be stuck and be unable to be controlled. For example, if the VAV damper position has not changed by more than five degrees within the past week or over the past twenty four hours, this may indicate that a controller of the VAV unit is unable to change the position of the VAV unit. In some embodiments, based on data for the VAV units 702-706, a change threshold can be determined. The change threshold may indicate a range of positions of the VAV dampers of the VAV units 702-706 (e.g., between 10 degrees and 50 degrees, a range of 40 degrees). If the VAV unit 702 has experienced a range that is a predefined amount less than the range for the VAV units 702-706 (e.g., between 30 degrees and 35 degrees, a range of 5 degrees), the rule analyzer 916 can be configured to determine that the damper of the VAV unit 702 may be stuck. In this regard, the VAV position may be determined to be stuck and thus a recommendation to perform maintenance on the VAV damper can be generated by the recommendation generator 922.

The memory 903 is shown to include a recommendation generator 922. The recommendation generator 922 can be configured to receive indications from the performance analyzer 802 of recommendations to generate. The recommendations may be to perform maintenance on the VAV units 702-706, perform maintenance on the AHU 716, indicate that doors or windows should be closed in the zones 1-3, adjust various operating parameters of the equipment of a zone, and/or any other recommendation.

The recommendation generator 922 can be configured to generate a recommendation and display the recommendation on a display device of the thermostat 400, e.g., the display 402. Furthermore, the recommendation generator 922 can generate and/or provide the recommendation to the user device 806. In this regard, the recommendation generator 922 can be configured to provide a push notification to the user device 806 so that a user can respond to the recommendation.

The recommendation generator 922 can be configured to provide parameter updates to HVAC controller 924 of the memory 903 which can be configured to control the VAV units 702-706 and/or the AHU 716 to control various environmental conditions of the building 10 (e.g., the zones 1-3). The HVAC controller 924 can be configured to use any of a variety of control algorithms (e.g., state-based algorithms, extremum-seeking control algorithms, PID control algorithms, model predictive control algorithms, feedback control algorithms, etc.) to determine appropriate control actions for the VAV units 702-706 and/or the AHU 716 to control temperature and/or humidity of the zones 1-3.

Figure 10:
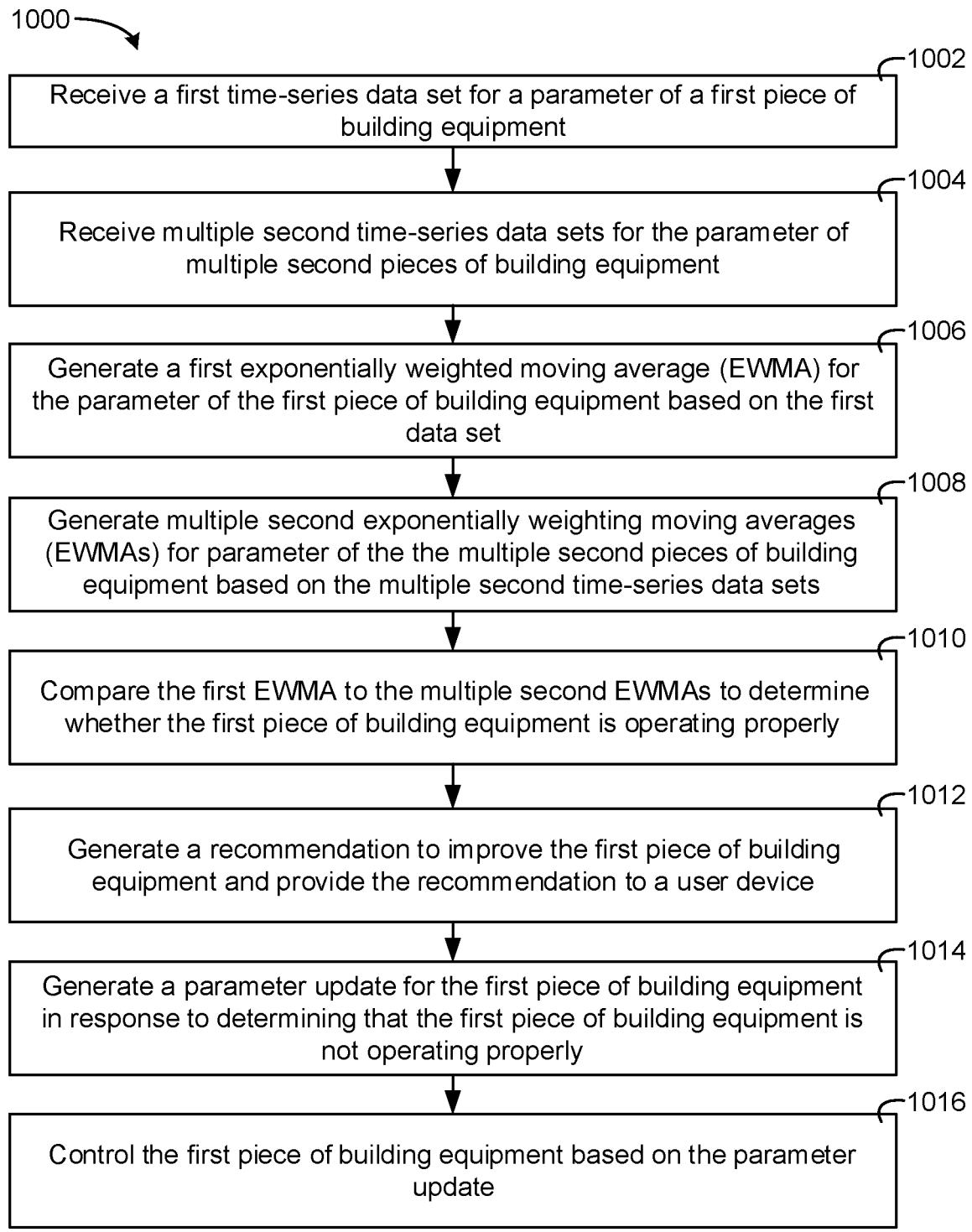
FIG. 10 is a flow diagram of a process for performing analysis on time-series data of the building equipment of FIG. 8 via exponentially weighted moving averages (EWMAs) to improve the performance of the building equipment, according to an exemplary embodiment.

Referring now to FIG. 10, a flowchart of a process 1000 is shown for generating a recommendation based on EWMA values for multiple zones, according to an exemplary embodiment. The thermostat 400 can be configured to perform the process 1000. More specifically, the EWMA analyzer 914 can be configured to perform the process 1000. The EWMA analyzer 914 can be configured to perform the process 1000. Furthermore, any computing device or system described herein can be configured to perform the process 1000.

In step 1002, the thermostat 400 can receive a time-series data set for a parameter of a first piece of building equipment. For example, the thermostat 400 can receive differential pressure time-series data, zone temperature time-series data, zone setpoint time-series data, etc. The time-series data can be received for a first piece of building equipment, e.g., the VAV unit 702. In some embodiments, the time-series data set can be data for a particular zone, e.g., the zone 1.

In step 1004, the thermostat 400 can receive multiple second time-series data sets for the same parameter as received in the step 1002. The multiple second time-series data sets may be for second pieces of building equipment associated with second zones. For example, the thermostat 400 can receive time-series data sets for the zones 2-3 (e.g., for the VAV units 702-706).

In step 1006, the EWMA analyzer 914 can generate a first EWMA for the first piece of building equipment based on the first time-series data set received in the step 1002. The EWMA analyzer 914 can generate the first EWMA for the parameter of the first piece of building equipment based on the first time-series data set received in the step 1002 based on the Equation 1. Likewise, in the step 1008, the EWMA analyzer 914 can generate the one or more second EWMAs for the parameter of the second pieces of building equipment based on the second-time.

In step 1008, the EWMA analyzer 914 can compare the first EWMA to the second EWMAs to determine whether the first piece of building equipment is operating properly. The comparison can be performed in order to identify whether the first piece of building equipment is deviating from the performance of the second pieces of building equipment. For example, if the first EWMA is a zone temperature and is a predefined amount less than the second EWMAs or a collective second EWMA (e.g., an average of the second EWMAs), this may indicate that the first piece of building equipment is unable to reach a particular setpoint even though the control parameters of the first piece of building equipment may be the same and/or similar to the second pieces of building equipment. This deviation may indicate that the first piece of building equipment requires maintenance. Furthermore, this deviation may indicate that a window or door of a zone associated with the first piece of building equipment is open and should be shut.

In some embodiments, where the first and second pieces of building equipment are VAV units which deliver heated or cooled are received from an AHU to various zones, if all the first and second EWMAs are for a zone temperature, and the EWMAs indicate that a predefined amount of time has passed where the EWMA zone temperature has not reached a particular setpoint, this may indicate that the AHU is not operating properly.

In step 1012, the recommendation generator 922 can be configured to generate a recommendation for improving the performance of the first and/or second pieces of building equipment. For example, the recommendation may be to close windows or doors in a particular zone, perform maintenance on the building equipment, perform maintenance on equipment serving the first or second pieces of building equipment (e.g., an AHU serving VAV units), generate a recommendation to adopt a new operating parameter for the first and/or second pieces of building equipment, and/or various other recommendations described elsewhere herein. In some embodiments, the recommendation is a recommendation shown in the FIGS. 13-14.

Furthermore, in the step 1012, the recommendation can be displayed to an end user. The thermostat 400 can display the recommendation on a display of the thermostat, e.g., the display 402. Furthermore, the thermostat 400 can transmit the recommendation to the user device 806. The user device 806 can be configured to provide the recommendation to an end user via a display of the user device 806.

In step 1014, based on the performance of the first piece of building equipment determined in the step 1010, the recommendation generator 922 can be configured to generate parameter updates. The parameter updates may be to lower and/or raise a temperature setpoint to make it easier for the first piece of building equipment to reach a setpoint temperature. In step 1016, the thermostat 400 can control the first piece of building equipment based on the updated operating parameter determined in the step 1014.

Figure 11:
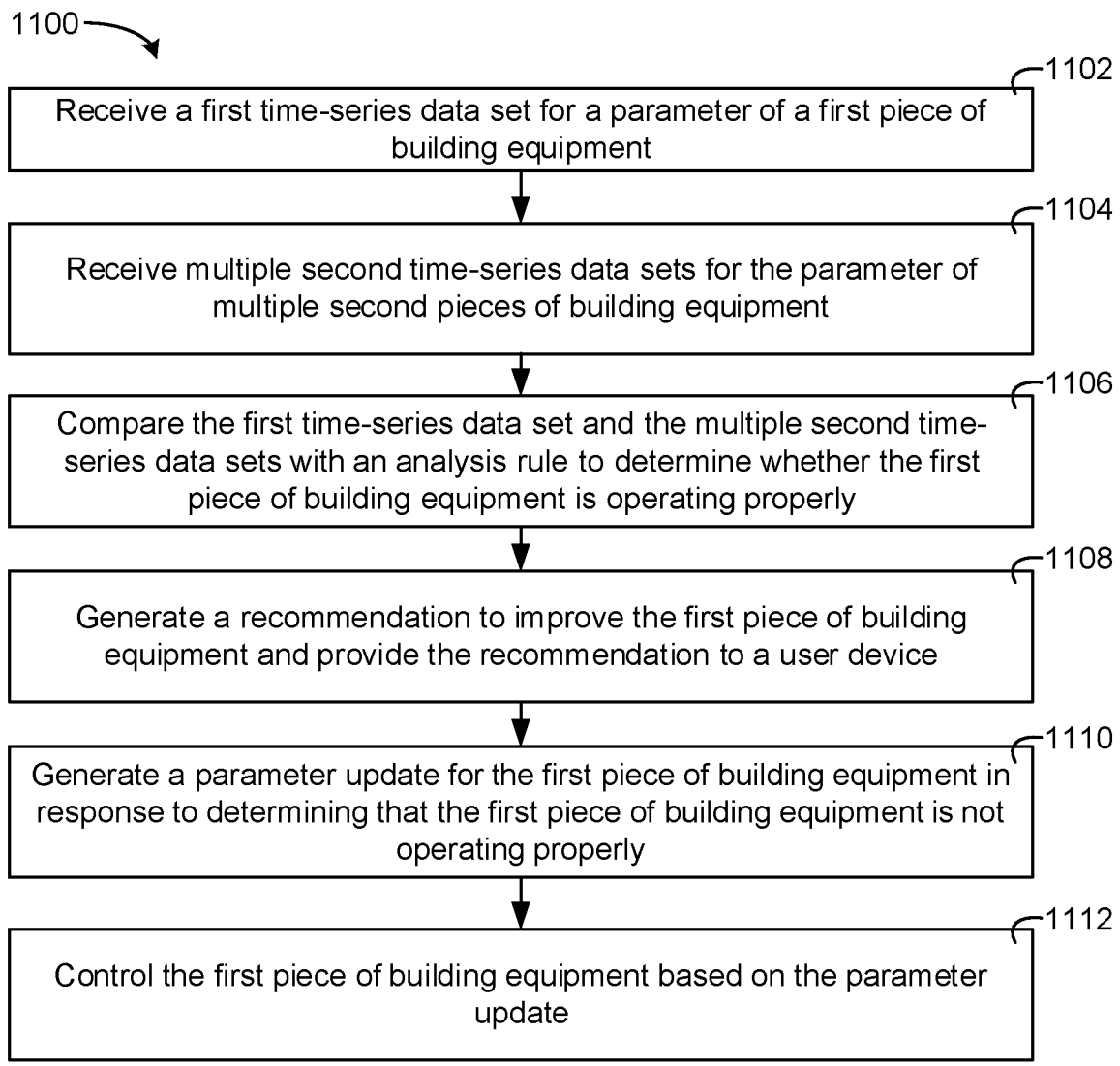
FIG. 11 is a flow diagram of a process for performing rule based analysis on time-series data of the building equipment of FIG. 8 via to improve the performance of the building equipment, according to an exemplary embodiment.

Referring now to FIG. 11, a flowchart of a process 1100 is shown for using rules to determine whether a first piece of building equipment is not performing properly, according to an exemplary embodiment. The thermostat 400 can be configured to perform the process 1100. More specifically, the rule analyzer 916 can be configured to perform the process 1100. The rule analyzer 916 can be configured to perform the process 1100. Furthermore, any computing device or system described herein can be configured to perform the process 1100.

In step 1102, the thermostat 400 can receive a time-series data set for a parameter of a first piece of building equipment. For example, the thermostat 400 can receive differential pressure time-series data, zone temperature time-series data, etc. The time-series data can be received for a first piece of building equipment, e.g., the VAV unit 702. In some embodiments, the time-series data set can be data for a particular zone, e.g., the zone 1.

In step 1104, the thermostat 400 can receive multiple second time-series data sets for the same parameter as received in the step 1002. The multiple second time-series data sets may be for second pieces of building equipment associated with second zones. For example, the thermostat 400 can receive time-series data sets for the zones 2-3 (e.g., for the VAV units 702-706). In some embodiments, the thermostat 400 can perform the process 1000 to determine EWMA time-series for the first time-series data set and/or the second time-series data sets and use the EWMA time-series in the steps 1106-1112.

In the step 1106, the rule analyzer 916 can compare the first time-series data set of the step 1102 with the second time-series data sets of the step 1104 with various analysis rules to determine whether the first piece of building equipment is operating properly. In some embodiments, the rules identify whether the performance of the first piece of building equipment is deviating from the performance of the second pieces of building equipment.

In some embodiments, the analysis rule is an AHU rule where the rule analyzer 916 determines that there is a performance issue with an AHU providing the first piece of building equipment (e.g., a VAV unit). For this rule, the time-series data sets received in the steps 1102 and 1104 may be ZNT values of various zones. The rule analyzer 916 can determine whether the ZNT value for each of the zones has reached a particular setpoint for each of the zones (e.g., is within a predefined window centered at the setpoint for the zone). If, after a predefined amount of time, none of the zones (or a predefined number of the zones) have not reached the setpoint, the rule analyzer 916 can determine that there is an issue with the AHU.

Another rule may be a VAV rule where the VAV rule determines whether one of the first piece of building equipment (e.g., a VAV unit) requires maintenance. With the VAV rule, the rule analyzer 916 can determine, based on time-series data for the first piece of building equipment and the multiple second pieces of building equipment (e.g., VAV units), whether a temperature value of one of the VAV units is taking long time to achieve a setpoint (e.g., a time-longer than a predefined amount). In some embodiments, the predefined amount is determined based on an average time-to-setpoint determined for all the pieces of building equipment. If one of the pieces of building equipment is associated a time-to setpoint a predefined amount greater than said average time, then the rule analyzer 916 may determine that there is an issue with the VAV unit.

In step 1108, the recommendation generator 922 can generate a recommendation to improve the performance of first piece of building equipment and/or the multiple second pieces of building equipment. The recommendation may be to perform maintenance on the first piece of building equipment and/or the multiple second pieces of building equipment. In some embodiments, the recommendation may recommend that various parameters or settings of the building equipment be adjusted. The recommendation generator 922 can cause a display of the thermostat 400 to display the generated recommendation of the step 1108 and/or cause the recommendation to be sent to the user device 806.

In step 1110, the recommendation generator 922 can generate a parameter update for the first piece of building equipment and/or the multiple second pieces of building equipment. The various parameter updates may be changes is setpoint, adjustments of valve positions, adjustments of runtime schedules, and/or any other control setting. In step 1112, the thermostat 400, in some embodiments, the HVAC controller 924, can control the first piece of building equipment and/or the second multiple pieces of building equipment based the updated parameters. This control can cause the first piece of building equipment and/or the second multiple pieces of building equipment to control one or more environmental conditions of a building and/or building zones.

Figure 12:
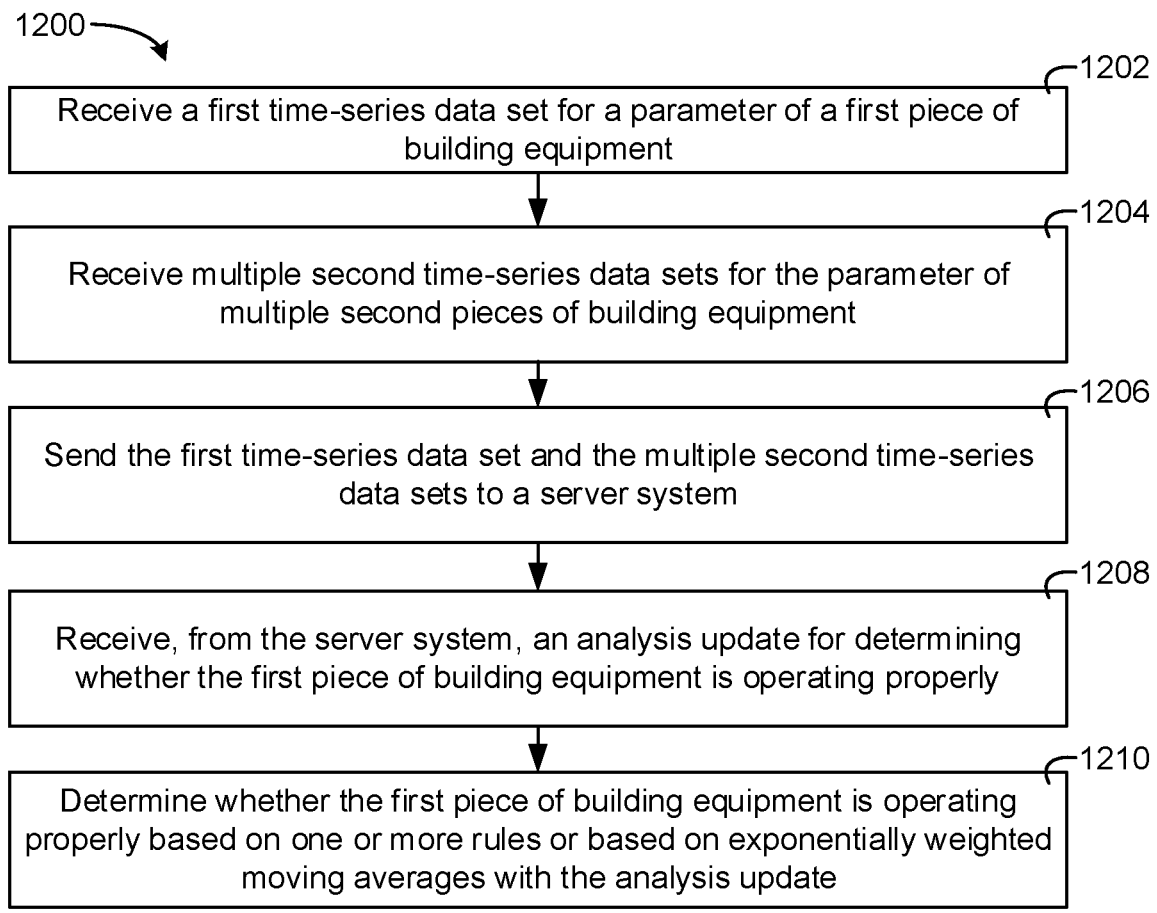
FIG. 12 is a flow diagram of a process for updating the performance analysis of FIGS. 10 and 11 via a server system, according to an exemplary embodiment.

Referring now to FIG. 12, a process 1200 is shown for performing updates to the analysis performed by the thermostat 400 by the server system 808, according to an exemplary embodiment. The thermostat 400 and/or the server system 808 can be configured to perform the process 1200. Furthermore, any computing device described herein can be configured to perform the process 1200.

In step 1202, the thermostat 400 can receive a time-series data set for a parameter of a first piece of building equipment. For example, the thermostat 400 can receive differential pressure time-series data, zone temperature time-series data, etc. The time-series data can be received for a first piece of building equipment, e.g., the VAV unit 702. In some embodiments, the time-series data set can be data for a particular zone, e.g., the zone 1.

In step 1204, the thermostat 400 can receive multiple second time-series data sets for the same parameter as received in the step 1002. The multiple second time-series data sets may be for second pieces of building equipment associated with second zones. For example, the thermostat 400 can receive time-series data sets for the zones 2-3 (e.g., for the VAV units 702-706).

In step 1206, the thermostat 400 can communicate the first time-series data set and the multiple second time-series data sets to the server system 808. The server system 808 can perform various data analysis techniques, e.g., data mining techniques, to update and/or improve the analysis performed by the thermostat 400. In some embodiments, a user can review the collected data via the server system 808 and make various changes or modifications of the analysis performed by the thermostat 400.

In step 1208, the server system can send any analysis updates or changes it determines to the thermostat 400. The thermostat 400 can receive and store the analysis update. In the step 1210, the thermostat 400 can perform analysis to determine whether the first piece of building equipment and/or the multiple second pieces of building equipment are operating properly. The thermostat 400 can perform the process 1000 as described with reference to FIG. 10 and/or perform the process 1100 as described with reference to FIG. 11.

Referring now to FIGS. 13-14, an interface 1300 is shown display recommendations to an end user, according to an exemplary embodiment. The interface 1300 can be generated by the thermostat 400 and displayed on the display 402. In some embodiments, the thermostat 400 can cause the user device 806 to generate and display the interface 1300. The interface 1300 can include a description of the recommendation, (i.e., description 1302). The description 1302 may identify a particular piece of building equipment, a particular zone or area of the building 10 that is experiencing an issue, and may identify the performance issue which may need to be address.

Furthermore, the interface 1300 is shown to include solutions description 1303. The solutions description 1303 may indicate one or more recommended actions to perform in order to remove the error. The solution description 1303 may include the various performance actions determined from the rules and/or EWMA analysis. In some embodiments, the solutions are ordered based on the rate at which particular solutions alleviate performance issues. For example, the thermostat 400 may record feedback from the feedback elements 1304, i.e., a fixed element 1308 and an ignore element 1306. The thermostat 400 can record which actions fix the performance issue at the highest rate and recommend those issues at the top of the list of solutions.

Furthermore, the user can enter a custom solution in the box 1310. In this regard, the thermostat 400 can receive and consider a new solution. The solution can be confirmed to be entered by a user by interacting with the add solution element 1312. As shown in FIG. 14, the user can test one or all of the solutions 1303. Once a solution is attempted, the user can press fixed element 1308 and/or ignore element 1306. If a user presses ignore element 1306, this may indicate that the solution did not alleviate the performance issue. The ignored solution can be removed from the list of solutions 1303 as the user attempts the next solution of the solution list 1303.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for predicting a performance of building equipment and controlling the building equipment, the thermostat comprising a processing circuit configured to:
   operate the building equipment to control an environmental condition within a building comprising a first zone and one or more second zones;
   receive a first time-series data set for a parameter of a first piece of the building equipment associated with the first zone;
   receive one or more second time-series data sets for the parameter of one or more second pieces of building equipment associated with the one or more second zones, wherein the first piece of building equipment and the one or more second pieces of building equipment are a same type of building equipment;
   perform a comparison comprising comparing the first time-series data set with the one or more second time-series data sets to detect a performance issue of the first piece of building equipment, the comparison indicating that a performance of the first piece of building equipment has deviated by a particular amount from a nominal performance indicated by the one or more second time-series data sets of the one or more second pieces of building equipment; and
   generate one or more recommendations for resolving the performance issue of the first piece of the building equipment based on the comparison of the first time-series data set with the one or more second time-series data sets.

2. The thermostat of claim 1, wherein the processing circuit is configured to:
   generate a parameter update for the first piece of building equipment in response to determining that the first piece of building equipment is not operating properly based on the comparison of the first time-series data set with the one or more second time-series data sets; and
   control the first piece of building equipment to control the environmental condition of the building in the first zone based on the parameter update.

3. The thermostat of claim 1, wherein the processing circuit is configured to:
   transmit the first time-series data set and the one or more second time-series data sets to a cloud server system, wherein the cloud server system is configured to generate analysis updates;
   receive, from the cloud server system, the analysis updates; and
   compare the first time-series data set with the one or more second time-series data sets based on the analysis updates.

4. The thermostat of claim 1, wherein the parameter is a zone temperature (ZNT), wherein the first time-series data set comprises a first plurality of values for the ZNT and each of the one or more second time-series data sets comprise a second plurality of values for the ZNT;
   wherein the processing circuit is configured to compare the first time-series data set with the one or more second time-series data sets by:
      determining a time-to-setpoint threshold based on the second plurality of values of the ZNT for each of the one or more second time-series data sets;
      determining whether the ZNT of the first zone has reached a temperature setpoint within the time-to-setpoint threshold based on the first plurality of values for the ZNT of the first time-series data set; and determining that the first piece of building equipment is not operating properly in response to determining that the ZNT of the first zone has not reached the temperature setpoint within the time-to-setpoint threshold.

5. The thermostat of claim 1, wherein the processing circuit is configured to:
generate a first exponentially weighted moving average (EWMA) based on the first time-series data set;
generate one or more second exponentially weighted moving averages (EWMAs) based on the one or more second time-series data sets; and
compare the first time-series data set with the one or more second time-series data sets by comparing the first EWMA with the one or more second EWMAs.

6. The thermostat of claim 5, wherein comparing the first exponentially weighted moving average (EWMA) with the one or more second exponentially weighted moving averages (EWMAs) comprises:
determining whether the first EWMA is a predefined amount less than or greater than the one or more second EWMAs;
determining that the first piece of building equipment is not operating properly in response to determining that the first EWMA is the predefined amount less than or greater than the one or more second EWMAs; and
determining that the first piece of building equipment is operating properly in response to determining that the first EWMA is not the predefined amount less than or greater than the one or more second EWMAs.

7. The thermostat of claim 1, wherein the processing circuit is configured to:
generate a recommendation interface based on the one or more recommendations,
wherein the recommendation interface comprises an indication of each of the one or more recommendations and a feedback element;
cause a user device to display the recommendation interface on a user interface of the user device;
receive feedback from the user device, wherein the feedback is based on a user interaction with the feedback element via the user interface of the user device; and
generate one or more new recommendations for improving the performance of the first piece of building equipment in response to determining that the first piece of building equipment is not operating properly and based on the feedback.

8. The thermostat of claim 7, wherein the feedback element comprises a first element indicating that a particular recommendation of the one or more recommendations improved the performance of the first piece of building equipment and a second element indicating that the particular recommendation did not improve the performance of the first piece of building equipment, wherein the feedback element comprises a custom recommendation element for inputting a user defined custom recommendation;
wherein the processing circuit is configured to:
receive the user defined custom recommendation from the user device, wherein the user defined custom recommendation is entered by a user of the user device via the custom recommendation element; and
generate the one or more new recommendations for improving the performance of the first piece of building equipment in response to determining that the first piece of building equipment is not operating properly based on the feedback and the user defined custom recommendation.

9. The thermostat of claim 1, wherein the first piece of building equipment associated with the first zone is a first variable air volume (VAV) box configured to receive air from an air handler unit (AHU), wherein the one or more second pieces of building equipment associated with the one or more second zones are one or more second VAV boxes configured to receive air from the AHU.

10. The thermostat of claim 9, wherein the parameter is a zone temperature (ZNT) and the first time-series data set comprises a first plurality of values for the ZNT and the one or more second time-series data sets each comprise a second plurality of values for the ZNT;
wherein the processing circuit is configured to:
determine a first time-to-setpoint value for the first VAV box and one or more second time-to-setpoint values for the one or more second VAV boxes based on the first plurality of values of the ZNT of the first time-series data set and the second plurality of values of the ZNT of each of the one or more second time-series data sets;
determine whether the first time-to-setpoint value and the one or more second time-to-setpoint values are greater than a predefined amount; and
generate an AHU recommendation in response to determining that the first time-to-setpoint value and the one or more second time-to-setpoint values are greater than the predefined amount, wherein the AHU recommendation comprises an indication to perform maintenance on the AHU.

11. The thermostat of claim 10, wherein the parameter of the first VAV box is an airflow parameter, wherein the first time-series data set comprises a value for the airflow parameter and each of the one or more second time-series data sets comprises a plurality of values for the airflow parameter, wherein the airflow parameter comprises at least one of a differential pressure parameter and an airflow rate parameter;
wherein the processing circuit is configured to compare the first time-series data set with the one or more second time-series data sets by:
determining an airflow threshold based on the plurality of values for the airflow parameter of each of the one or more second time-series data sets; and
determining that the first VAV box is not operating properly in response to determining that the value of the airflow parameter for the first time-series data set is greater than the airflow threshold;
wherein the one or more recommendations comprises a recommendation to close a door or window within the first zone.

12. A method for predicting a performance of building equipment and controlling the building equipment via a thermostat, the method comprising:
operating the building equipment to control an environmental condition within a building comprising a first zone and one or more second zones;
receiving a first time-series data set for a parameter of a first piece of building equipment associated with the first zone;
receiving one or more second time-series data sets for the parameter of one or more second pieces of building equipment associated with the one or more second zones, wherein the first piece of building equipment and the one or more second pieces of building equipment are a same type of building equipment;
performing a comparison comprising comparing the first time-series data set with the one or more second time-series data sets to detect a performance issue of the first piece of building equipment, the comparison indicating that a performance of the first piece of building equipment has deviated by a particular amount from a nominal performance indicated by the one or more second time-series data sets of the one or more second pieces of building equipment; and generating one or more recommendations for resolving the performance issue of the first piece of building equipment based on the comparison of the first time-series data set with the one or more second time-series data sets.

13. The method of claim 12, further comprising:
generating a parameter update for the first piece of building equipment in response to determining that the first piece of building equipment is not operating properly based on the comparison of the first time-series data set with the one or more second time-series data sets; and
controlling the first piece of building equipment to control the environmental condition of the building in the first zone based on the parameter update.

14. The method of claim 12, further comprising:
transmitting the first time-series data set and the one or more second time-series data sets to a cloud server system, wherein the cloud server system is configured to generate analysis updates;
receiving, from the cloud server system, the analysis updates; and
comparing the first time-series data set with the one or more second time-series data sets is based on the analysis updates.

15. The thermostat of claim 12, wherein the parameter is a zone temperature (ZNT), wherein the first time-series data set comprises a first plurality of values for the ZNT and each of the one or more second time-series data sets comprise a second plurality of values for the ZNT;
wherein comparing the first time-series data set with the one or more second time-series data sets comprises:
determining a time-to-setpoint threshold based on the second plurality of values of the ZNT for each of the one or more second time-series data sets;
determining whether the ZNT of the first zone has reached a temperature setpoint within the time-to-setpoint threshold based on the first plurality of values for the ZNT of the first time-series data set; and
determining that the first piece of building equipment is not operating properly in response to determining that the ZNT of the first zone has not reached the temperature setpoint within the time-to-setpoint threshold.

16. The method of claim 12, wherein the first piece of building equipment associated with the first zone is a first variable air volume (VAV) box configured to receive air from an air handler unit (AHU), wherein the one or more second pieces of building equipment associated with the one or more second zones are one or more second VAV boxes configured to receive air from the AHU.

17. The method of claim 16, wherein the parameter is a zone temperature (ZNT) and the first time-series data set comprises a first plurality of values for the ZNT and the one or more second time-series data sets each comprise a second plurality of values for the ZNT;
wherein the method further comprises:
determining a first time-to-setpoint value for the first VAV box and one or more second time-to-setpoint values for the one or more second VAV boxes based on the first plurality of values of the ZNT of first time-series data set and the second plurality of values of the ZNT of each of the one or more second time-series data sets;
determining whether the first time-to-setpoint value and the one or more second time-to-setpoint values are greater than a predefined amount; and
generating an AHU recommendation in response to determining that the first time-to-setpoint value and the one or more second time-to-setpoint values are greater than the predefined amount, wherein the AHU recommendation comprises an indication to perform maintenance on the AHU.

18. The method of claim 16, wherein the parameter of the first VAV box is an airflow parameter, wherein the first time-series data set comprises a value for the airflow parameter and each of the one or more second time-series data sets comprises a plurality of values for the airflow parameter, wherein the airflow parameter comprises at least one of a differential pressure parameter and an airflow rate parameter;
wherein comparing the first time-series data set with the one or more second time-series data sets comprises:
determining an airflow threshold based on the plurality of values for the airflow parameter of each of the one or more second time-series data sets; and
determining that the first VAV box is not operating properly in response to determining that the value of the airflow parameter for the first time-series data set is greater than the airflow threshold;
wherein the one or more recommendations comprises a recommendation to close a door or window within the first zone.

19. A building controller for predicting a performance of building equipment and controlling the building equipment, the building controller comprising a processing circuit configured to:
operate the building equipment to control an environmental condition within a building comprising a first zone and one or more second zones;
receive a first time-series data set for a parameter of a first piece of building equipment associated with the first zone;
receive one or more second time-series data sets for the parameter of one or more second pieces of building equipment associated with the one or more second zones, wherein the first piece of building equipment associated with the first zone is a first variable air volume (VAV) box configured to receive air from an air handler unit (AHU), wherein the one or more second pieces of building equipment associated with the one or more second zones are one or more second VAV boxes configured to receive air from the AHU;
perform a comparison of the first time-series data set with the one or more second time-series data sets to detect a fault of the first VAV box, wherein the comparison indicates that a performance of the first VAV box has deviated by a particular amount from a nominal performance indicated by the one or more second time-series data sets of the one or more second VAV boxes; and
generate one or more maintenance recommendations for resolving the fault of the first VAV box based on the comparison of the first time-series data set with the one or more second time-series data sets.

20. The building controller of claim 19, wherein the parameter is a zone temperature (ZNT) and the first time-series data set comprises a first plurality of values for the ZNT and the one or more second time-series data sets each comprise a second plurality of values for the ZNT;
    wherein the processing circuit is configured to:
        determine a first time-to-setpoint value for the first VAV box and one or more second time-to-setpoint values for the one or more second VAV boxes based on the first plurality of values of the ZNT of first time-series data set and the second plurality of values of the ZNT of each of the one or more second time-series data sets;
        determine whether the first time-to-setpoint value and the one or more second time-to-setpoint values are greater than a predefined amount; and
generate an AHU recommendation in response to determining that the first time-to-setpoint value and the one or more second time-to-setpoint values are greater than the predefined amount,
wherein the AHU recommendation comprises an indication to perform maintenance on the AHU.

\* \* \* \* \*